United States Patent
Kwon et al.

(10) Patent No.: US 11,619,952 B2
(45) Date of Patent: Apr. 4, 2023

(54) MULTI-SENSOR-BASED UNMANNED AERIAL VEHICLE AND METHOD FOR CONTROLLING SAME

(71) Applicant: Samsung Electronics Co., Ltd., Suwon-si (KR)

(72) Inventors: Woong Kwon, Suwon-si (KR); Junho Park, Suwon-si (KR); Sunggu Kwon, Suwon-si (KR); Jawon Seo, Suwon-si (KR); Kyungshik Roh, Suwon-si (KR); Minsu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 17/013,465

(22) Filed: Sep. 4, 2020

(65) Prior Publication Data

US 2021/0072770 A1 Mar. 11, 2021

(30) Foreign Application Priority Data

Sep. 6, 2019 (KR) .................. 10-2019-0110856

(51) Int. Cl.
*G05D 1/10* (2006.01)
*G05D 1/00* (2006.01)
(Continued)

(52) U.S. Cl.
CPC ........... *G05D 1/101* (2013.01); *B64C 39/024* (2013.01); *B64D 47/08* (2013.01); *G05D 1/0094* (2013.01);
(Continued)

(58) Field of Classification Search
CPC ...... G05D 1/101; G05D 1/0094; G05D 1/042; G05D 1/0808; B64C 39/024;
(Continued)

(56) References Cited

U.S. PATENT DOCUMENTS 9,387,927 B2 * 7/2016 Rischmuller .......... G05D 1/102
9,619,709 B2 * 4/2017 Stark ...................... B64D 47/06
(Continued)

FOREIGN PATENT DOCUMENTS

JP 2017-102942 A 6/2017
JP 2018-055695 A 4/2018
(Continued)

OTHER PUBLICATIONS

Raul Mur-Artal, "ORB-SLAM: a Versatile and Accurate Monocular SLAM System", Sep. 2015, IEEE, Transaction of Robots, Whole document, (Year: 2015).*
(Continued)

*Primary Examiner* — Peter D Nolan
*Assistant Examiner* — Kenneth M Dunne

(57) ABSTRACT

An unmanned aerial vehicle may include: a sensor part configured to acquire inertia information or position information of the unmanned aerial vehicle; and a controller. The controller is configured to estimate the position of the unmanned aerial vehicle by applying the information acquired by the sensor part to an extended Kalman filter and control movement of the unmanned aerial vehicle, based on the estimated position of the unmanned aerial vehicle. The sensor part includes: an inertia sensor configured to acquire the inertia information of the unmanned aerial vehicle; a tag recognition sensor configured to recognize a tag attached to a rack and acquire absolute position information of the unmanned aerial vehicle; and an image sensor attached to the unmanned aerial vehicle so as to acquire an image of the movement environment of the unmanned aerial vehicle.

16 Claims, 21 Drawing Sheets

(51) Int. Cl.
*G05D 1/04* (2006.01)
*G05D 1/08* (2006.01)
*B64D 47/08* (2006.01)
*G06K 7/14* (2006.01)
*B64C 39/02* (2006.01)

(52) U.S. Cl.
CPC ........... *G05D 1/042* (2013.01); *G05D 1/0808* (2013.01); *G06K 7/1413* (2013.01); *B64C 2201/027* (2013.01); *B64C 2201/127* (2013.01); *B64C 2201/14* (2013.01)

(58) Field of Classification Search
CPC ........ B64C 2201/027; B64C 2201/127; B64C 2201/14; B64D 47/08; G06K 7/1413
See application file for complete search history.

(56) References Cited

U.S. PATENT DOCUMENTS

| | | | | |
|---|---|---|---|---|
| 9,753,355 | B2* | 9/2017 | Waibel | G05D 1/101 |
| 9,964,951 | B1* | 5/2018 | Dunn | G06V 20/17 |
| 11,164,149 | B1* | 11/2021 | Williams | B64C 39/02 |
| 2016/0059418 | A1* | 3/2016 | Nakamura | G05D 1/0274 901/1 |
| 2016/0068267 | A1* | 3/2016 | Liu | G05D 1/0061 701/4 |
| 2017/0153122 | A1* | 6/2017 | Tang | B64D 47/08 |
| 2017/0193830 | A1* | 7/2017 | Fragoso | G08G 5/0069 |
| 2017/0337824 | A1* | 11/2017 | Chen | G08G 5/0086 |
| 2017/0341776 | A1* | 11/2017 | McClure | G01C 21/20 |
| 2018/0164124 | A1 | 6/2018 | Viswanathan et al. | |
| 2018/0210465 | A1* | 7/2018 | Qu | B64D 47/08 |
| 2019/0033867 | A1* | 1/2019 | Sharma | G08G 1/0133 |
| 2019/0178646 | A1* | 6/2019 | Roumeliotis | G05D 1/0274 |
| 2019/0235531 | A1* | 8/2019 | Liu | G01C 21/206 |
| 2019/0329903 | A1* | 10/2019 | Thompson | B64C 39/024 |
| 2020/0301445 | A1* | 9/2020 | Jourdan | G06K 19/06037 |
| 2020/0379480 | A1* | 12/2020 | Mazaheri Tehrani | G06V 20/10 |
| 2021/0325904 | A1* | 10/2021 | Chaumette | G05D 1/104 |
| 2022/0024036 | A1* | 1/2022 | Voorhies | G05D 1/0234 |

FOREIGN PATENT DOCUMENTS

| | | |
|---|---|---|
| KR | 10-2019-0054755 A | 5/2019 |
| KR | 10-2019-0067288 A | 6/2019 |
| WO | 2018/035482 A1 | 2/2018 |
| WO | WO-2018035482 A1 * | 2/2018 |

OTHER PUBLICATIONS

Beul et al., "Fast Autonomous Flight in Warehouses for Inventory Applications", IEEE Robotics and Automation Letters (RAL) paper presented at the 2018 IEEE/RSJ International Conference on Intelligent Robots and Systems (IROS), Oct. 1-5, 2018, 8 pages.

Kwon et al., "Robust Autonomous Navigation of Unmanned Aerial Vehicles (UAVs) for Warehouses' Inventory Applications", Samsung, 2019, 8 pages.

International Search Report and Written Opinion of the International Searching Authority in connection with International Application No. PCT/KR2020/011980 dated Dec. 18, 2020, 8 pages.

Translation of previously cited "Development of accurate position recognition technology based on sensor fusion for drones II", Jan. 2018, 44 pages.

* cited by examiner

MULTI-SENSOR-BASED UNMANNED AERIAL VEHICLE AND METHOD FOR CONTROLLING SAME

CROSS-REFERENCE TO RELATED APPLICATION

This application is based on and claims priority under 35 U.S.C. 119 to Korean Patent Application No. 10-2019-0110856 filed on Sep. 6, 2019 in the Korean Intellectual Property Office, the disclosure of which is herein incorporated by reference in its entirety.

BACKGROUND

1. Field

Various embodiments relate to a multi-sensor-based unmanned aerial vehicle and a method for controlling the same.

2. Description of Related Art

An unmanned aerial vehicle (UAV) is an aircraft or helicopter type aerial vehicle which flies by the guidance of radio waves without a human pilot on board.

An unmanned aerial vehicle originated in the munitions industry. However, with the commercial use thereof, studies on the unmanned aerial vehicle have been actively made. In particular, an unmanned aerial vehicle has advantages of simplicity, rapidity, economical efficiency, etc. and thus is used in various fields, such as exploration, broadcasting, leisure, etc., in addition to the military use thereof.

Recently, with the advent of an unmanned aerial vehicle which can sense an object through a camera and a sensor and can quickly move, the use of an unmanned aerial vehicle has expanded to industries, such as product transportation, warehouse management, and inventory checking.

The above information is presented as background information only to assist with an understanding of the disclosure. No determination has been made, and no assertion is made, as to whether any of the above might be applicable as prior art with regard to the disclosure.

SUMMARY

Conventional unmanned aerial vehicles applied to industrial fields autonomously move based on GPS data, and thus may not be used in an indoor space in which GPS data are difficult to obtain.

With the rise of a need for an unmanned aerial vehicle capable of autonomously moving indoors, a method for recognizing an unmanned aerial vehicle position without GPS data indoors was proposed. The proposed method is a method for generating a 3D map by using a 3D lidar attached to an unmanned aerial vehicle and recognizing the position of the unmanned aerial vehicle in the generated 3D map. However, the above method is problematic in that a sensor used to generate a 3D map is expensive, manual flight is necessary for generating a 3D map, and memory and a calculation time necessary for generating a 3D map increases rapidly as a target area becomes larger.

Another proposed method for recognizing the position of an unmanned aerial vehicle indoors is a method for recognizing, by using an edge or line formed in an area below a movement path of the unmanned aerial vehicle, the relative position of the unmanned aerial vehicle from the edge or line.

However, this method may not determine the absolute position of an unmanned aerial vehicle, and may not recognize even the relative position of the unmanned aerial vehicle when an edge or line cannot be extracted from an area below a movement path. Thus, a new method, which can more accurately recognize the position of an unmanned aerial vehicle indoors, is actually needed.

Therefore, an aspect of the disclosure is to provide an unmanned aerial vehicle capable of performing robust position recognition indoors at a low cost so as to solve the above-described problems.

An unmanned aerial vehicle according to various embodiments may include: a sensor part configured to acquire inertia information or position information of the unmanned aerial vehicle; and a controller configured to estimate the position of the unmanned aerial vehicle by applying the information acquired by the sensor part to an extended Kalman filter and control movement of the unmanned aerial vehicle, based on the estimated position of the unmanned aerial vehicle, wherein the sensor part includes: an inertia sensor configured to acquire the inertia information of the unmanned aerial vehicle; a tag recognition sensor configured to recognize a tag attached to a rack and acquire absolute position information of the unmanned aerial vehicle; and an image sensor attached to the unmanned aerial vehicle so as to acquire an image of the movement environment of the unmanned aerial vehicle.

A method according to various embodiments may include: acquiring inertia information of an unmanned aerial vehicle; recognizing a tag attached to a rack through a tag recognition sensor and acquiring absolute position information of the unmanned aerial vehicle; acquiring first visual movement distance (visual odometry) information of the unmanned aerial vehicle, based on the acquired absolute position information of the unmanned aerial vehicle and an unmanned aerial vehicle movement environment image acquired by an image sensor; and estimating the position of the unmanned aerial vehicle by applying the acquired absolute position information or first visual movement distance information of the unmanned aerial vehicle to an extended Kalman filter.

An unmanned aerial vehicle according to various embodiments can recognize a position thereof at a low cost by using multiple sensors without separate manual flight or calculation.

Further, an unmanned aerial vehicle according to various embodiments can perform robust position recognition by minimizing an influence of an outlier or disturbance of a sensor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
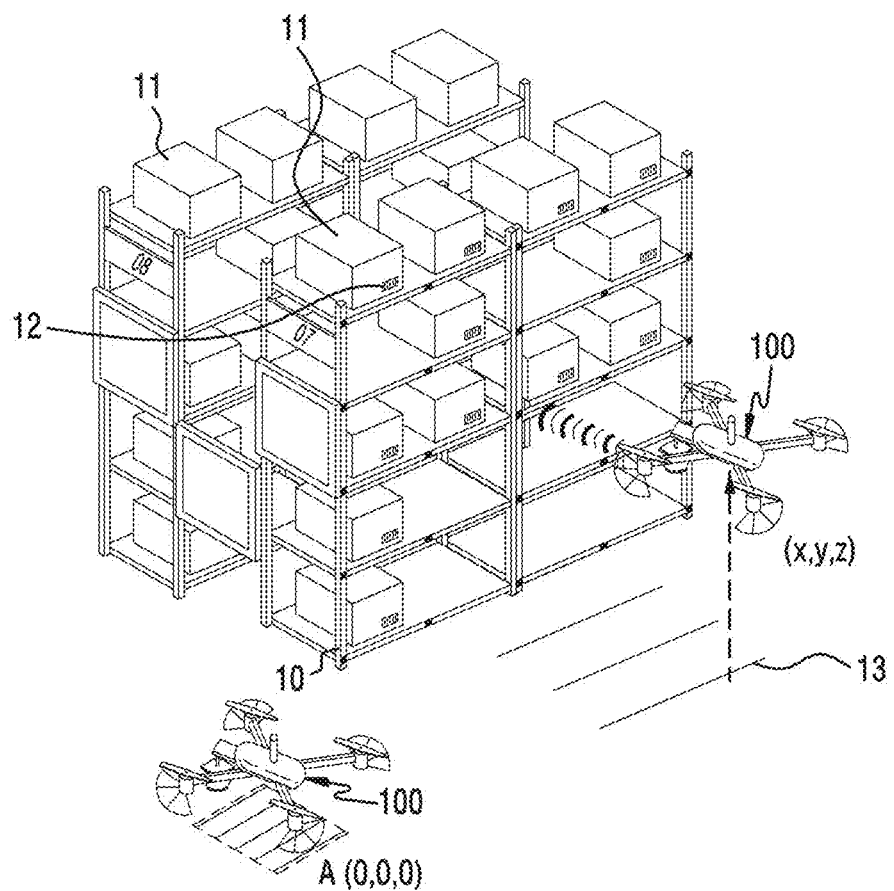
FIG. 1 illustrates an autonomous movement operation of an unmanned aerial vehicle according to various embodiments.

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to"

another element (e.g., a second element), it means that the element may be coupled with the other element directly (e.g., wiredly), wirelessly, or via a third element.

FIG. 1 illustrates an autonomous movement operation of an unmanned aerial vehicle according to various embodiments.

Referring to FIG. 1, an unmanned aerial vehicle 100 according to various embodiments may be an electronic device capable of autonomously moving (or flying) in the horizontal or vertical direction. In one example, the unmanned aerial vehicle 100 may be a drone.

The unmanned aerial vehicle 100 according to one embodiment may check the stock of products 11 stacked in a fixed place 10 (or a rack) while autonomously moving along an indoor aisle 13. The unmanned aerial vehicle 100 may include multiple sensors and may grasp absolute position information and/or relative position information of the unmanned aerial vehicle 100.

In one example, the unmanned aerial vehicle 100 may recognize a barcode 12 attached to each of the products 11 at the specific position thereof, and may grasp the quantity and/or storage positions of the products 11, based on the result of the recognition. The unmanned aerial vehicle 100 may check the stock of the products 11 stacked on the rack 10 positioned at each of both ends of the aisle 13 while moving along the aisle 13. According to an embodiment, the unmanned aerial vehicle 100 may check only the stock of the products 11 stacked in a specific position.

In another example, the unmanned aerial vehicle 100 may estimate, based on sensing values of multiple sensors, a current movement (flight) position thereof indoors without using separate GPS data. According to one embodiment, the unmanned aerial vehicle 100 may configure a movement start position (e.g. region A in FIG. 1) as the origin (0,0,0) to represent an indoor autonomous movement region by a world coordinate system, and may estimate the current position of the unmanned aerial vehicle 100 based on the sensing values of the multiple sensor and may represent the current position by coordinate data (x, y, z). That is, the unmanned aerial vehicle 100 may represent the indoor autonomous movement region by a world coordinate system and thus may estimate the current position of the unmanned aerial vehicle 100 without manual movement for determining the structure of the indoor region. Hereinafter, a process of estimating the position of the unmanned aerial vehicle 100 will be described in detail.

Figure 2:
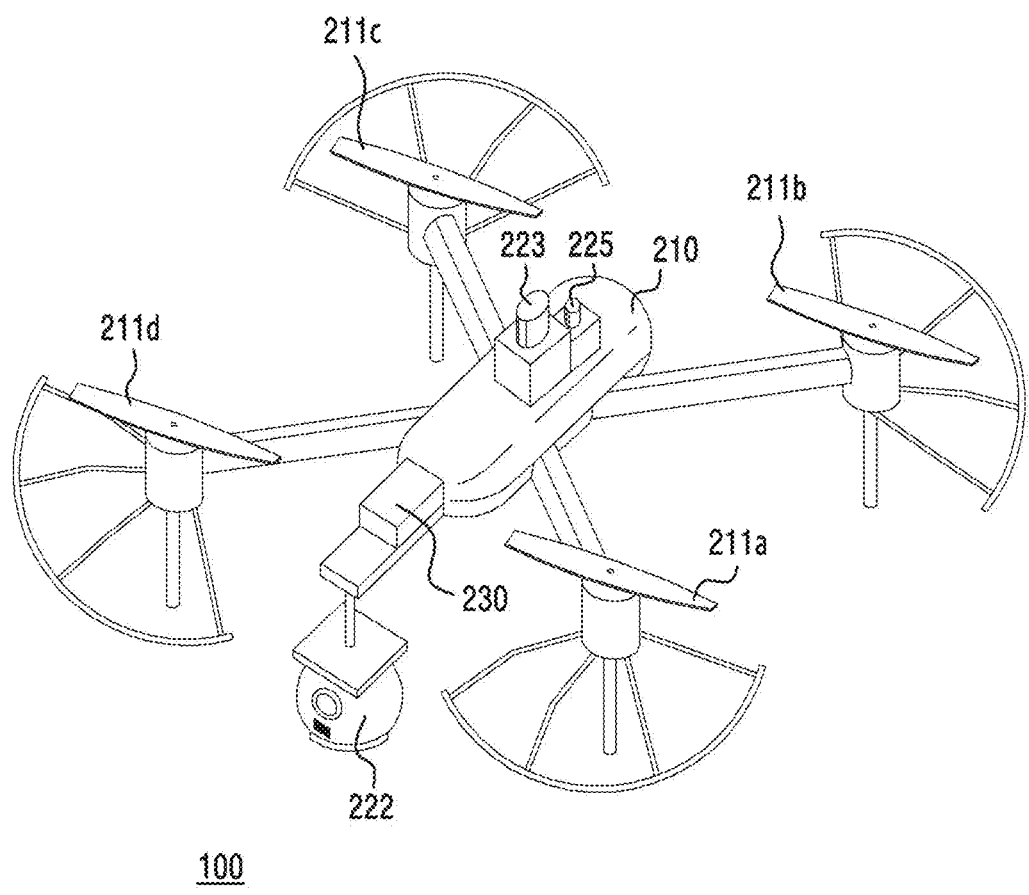
FIG. 2 illustrates a perspective view of an unmanned aerial vehicle according to various embodiments.
Figure 3:
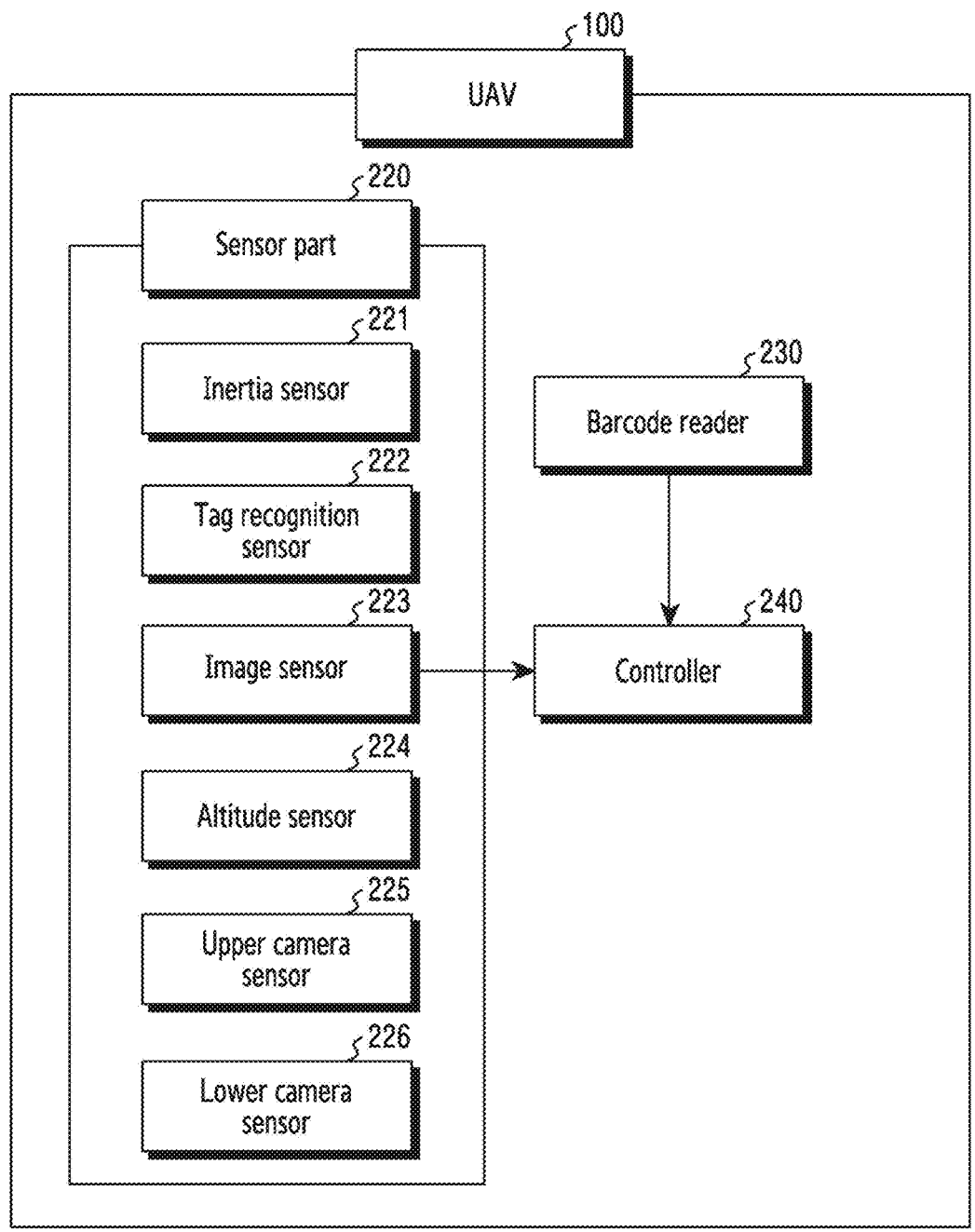
FIG. 3 illustrates elements of an unmanned aerial vehicle according to various embodiments.

FIG. 2 illustrates a perspective view of an unmanned aerial vehicle 100 according to various embodiments. FIG. 3 illustrates elements of an unmanned aerial vehicle 100 according to various embodiments.

Referring to FIGS. 2 and 3, the unmanned aerial vehicle 100 according to one embodiment may include a body 210, at least one rotation part 211a, 211b, 211c, or 211d attached to the body 210, a sensor part 220, a barcode reader 230, and a controller 240.

According to one embodiment, a first rotation part 211a, a second rotation part 211b, a third rotation part 211c, and a fourth rotation part 211d may be attached to the body 210 of the unmanned aerial vehicle 100. The unmanned aerial vehicle 100 may move (or fly) in the horizontal or vertical direction by rotating the first rotation part 211a, the second rotation part 211b, the third rotation part 211c, and the fourth rotation part 211d. In one example, the first rotation part 211a and the third rotation part 211c, positioned in the diagonal direction in reference to the body 210, may operate in pairs, and the second rotation part 211b and the fourth rotation part 211d, positioned in the diagonal direction in reference to the body 210, may operate in pairs. However, the disclosure is not limited thereto. According to an embodiment, the first rotation part 211a, the second rotation part 211b, the third rotation part 211c, and the fourth rotation part 211d may be independently operated.

According to one embodiment, the barcode reader 230 may be attached to the body 210 of the unmanned aerial vehicle 100 so as to recognize a barcode (e.g. the barcode 12 in FIG. 1) attached to a product (e.g. the product 11 in FIG. 1) at the specific position thereof. The unmanned aerial vehicle 100 may grasp information about the quantity or position of a product, stacked on a rack (e.g. the rack 10 in FIG. 1), through the barcode reader 230 while autonomously moving. The information about the quantity or position of the product, grasped by the unmanned aerial vehicle 100, may be transmitted to an external server, and the external server may check the stock of the product based on the information. Barcode attachment positions of products may be identical. However, the barcode attachment positions of products may be different depending on an embodiment.

According to one embodiment, the unmanned aerial vehicle 100 may acquire current movement information of the unmanned aerial vehicle 100 by using the sensor part 220 disposed on the inside or outside of the unmanned aerial vehicle 100. In one example, the sensor part 220 may be embedded in the body 210 and may include: an inertia sensor 221 capable of acquiring inertia information such as acceleration and angular velocity; a tag recognition sensor 222 capable of recognizing a tag attached to a rack (e.g. the rack 10 in FIG. 1); and an image sensor 223 capable of acquiring a movement environment image of the unmanned aerial vehicle 100 during the movement (or flight) of the unmanned aerial vehicle 100. In one embodiment, the inertia sensor 221 may be an inertial measurement unit (IMU), the tag recognition sensor 222 may be a camera capable of recognizing a tag, and the image sensor 223 may be at least one of a 2D lidar, a 3D lidar, a RGB-D sensor, and a camera. However, the elements are not limited thereto.

The controller 240 may be embedded in the body 210 and may estimate the current position and/or current movement direction of the unmanned aerial vehicle 100 by using the information (e.g. the inertial information, the movement environment image information, etc.) acquired by the sensor part 220. The controller 240 can control the movement (e.g. a movement direction, a movement altitude, a movement speed, etc.) of the unmanned aerial vehicle 100, based on the result of the estimation, and thus can safely move the unmanned aerial vehicle 100.

According to one embodiment, the controller 240 may acquire absolute position (absolute 6D pose) information of the unmanned aerial vehicle 100 in a world coordinate system, based on tag recognition information acquired by the tag recognition sensor 222. In the disclosure, position information of the unmanned aerial vehicle 100 may include a roll angle, a pitch angle, and a yaw angle in addition to x, y, and z coordinates based on the origin (e.g. region A in FIG. 1). Hereafter, position information may also be used while having the same meaning. A process in which the controller 240 acquires the absolute position information of the unmanned aerial vehicle 100 will be described in detail later.

According to another embodiment, the controller 240 may acquire relative position (relative pose) information or visual movement distance (visual odometry) information of the unmanned aerial vehicle 100, based on the inertia information of the unmanned aerial vehicle 100, acquired by the inertia sensor 221, and the movement environment image acquired by the image sensor 223. In one example, the controller 240 may acquire information on a relative six degrees of freedom position (relative 6D pose) of the unmanned aerial vehicle 100 by applying the acquired inertia information and movement environment image to a hector SLAM algorithm which is a scan matching technique, but is not limited thereto. Simultaneous localization and mapping (SLAM) in the disclosure is also known as simultaneous positioning and map construction, and may refer to a process of recognizing the position of an object from an environment or a scene and constructing a map of the surrounding environment. Further, hector SLAM may refer to a process of recognizing the position of an object, based on inertia information and image information, and constructing a map of the surrounding environment.

The controller 240 may estimate the position of the unmanned aerial vehicle 100 indoors by applying the inertia information, the absolute position information, and/or the relative position information of the unmanned aerial vehicle 100, acquired through the above-described process, to an extended Kalman filter (EKF).

The extended Kalman filter is a type of an algorithm for estimating the optimal position of an object in a linear or non-linear system. The controller 240 may estimate the current optimal position of the unmanned aerial vehicle 100 by applying information acquired by the sensor part 220 to the extended Kalman filter. The extended Kalman filter may repeat a state prediction and measurement update to estimate the position of the unmanned aerial vehicle 100. The controller 240 according to one embodiment may use the inertia information of the unmanned aerial vehicle 100 as a state variable for a state prediction, and may use the absolute position information or relative position information of the unmanned aerial vehicle 100 in a measurement update.

Specifically, if the pose of the inertia sensor 221 is identical to the pose of the unmanned aerial vehicle 100, a state vector x of the extended Kalman filter may be expressed by equation 1 below.

$$x = [p_w^{iT} \, v_w^{iT} \, q_w^{iT} \, b_a^T]^T \quad \text{[Equation 1]}$$

Herein, $p_w^i$ denotes a position vector in a world coordinate system, $v_w^i$ denotes a velocity vector, and $q_w^i$ denotes a quaternion indicating the rotation of the inertia sensor 221. Further, $b_w$ denotes a gyro bias and $b_a$ denotes an accelerometer bias.

$$\dot{p}_w^i = v_w^i \quad \text{[Equation 2]}$$

$$\dot{v}_w^i = R_w^i(a_m - b_a - n_a) - g \quad \text{[Equation 3]}$$

$$\dot{q}_w^i = \frac{1}{2}\Omega(\omega_m - b_w - n_\omega)q_w^i \quad \text{[Equation 4]}$$

$$\dot{b}_\omega = n_{b_\omega} \quad \text{[Equation 5]}$$

$$\dot{b}_a = n_{b_a} \quad \text{[Equation 6]}$$

A linearized error state equation such as Equation 7 below may be derived by defining an error state vector Δx and solving differential equations of Equations 2 to 6. The controller 240 may perform time-update of a state change of the extended Kalman filter by using Equation 7. $R_w^i$ denotes a rotation matrix corresponding to $q_w^i$, $a_m$ denotes acceleration acquired by the inertia sensor 221, $\omega_m$ denotes an angular velocity acquired by the inertia sensor 221, and g denotes a gravity vector in the world coordinate system.

Further, $n_a$, $n_\omega$, $n_{b_\omega}$, and $n_{b_a}$ denote gaussian noises. A and B in Equation 7 are linearized matrices of Equations 2 to 6.

$$\Delta \dot{x} = A\Delta x + Bn \quad \text{[Equation 7]}$$

In the extended Kalman filter, a measurement model may be expressed by Equation 8 below. The controller 240 may perform a measurement update by using the measurement model. In Equation 8, z denotes a measurement vector such as a position, an Euler angle, or a pose, h(x) denotes a measurement model variable depending on a state, and n denotes a gaussian measurement noise.

$$z = h(x) + n \quad \text{[Equation 8]}$$

That is, the controller 240 may estimate the position of the unmanned aerial vehicle 100 by using the inertia information of the unmanned aerial vehicle 100 in the process of time update of an extended Kalman filter state change and using the absolute position information and the relative position information of the unmanned aerial vehicle 100 in the process of measurement update of the extended Kalman filter.

The controller 240 may estimate the position of the unmanned aerial vehicle 100 by only information acquired by the inertia sensor 221, information acquired by the tag recognition sensor 222, and movement image information acquired by the image sensor 223. However, when the position is estimated as described above, a drift, an outlier, a disturbance, etc. may be caused due to uncertainty of an unmanned aerial vehicle 100 system itself and uncertainty of the result of sensing by the sensor part 220. The drift, the outlier, or the disturbance caused due to the uncertainty may affect the result of estimating the current position of the unmanned aerial vehicle 100 through the extended Kalman filter.

Thus, the sensor part 220 of the unmanned aerial vehicle 100 according to one embodiment may include an additional sensor in addition to the inertia sensor 221, the tag recognition sensor 222, and the image sensor 223, and may apply even information (robust data) acquired by the additional sensor to the extended Kalman filter to minimize an error caused by the drift, the outlier, or the disturbance.

In one example, the sensor part 220 may further include: an altitude sensor 224 configured to acquire information on the altitude of the unmanned aerial vehicle 100; an upper camera sensor 225 attached to the body 210 of the unmanned aerial vehicle 100 so as to acquire image information of an area above the movement path of the unmanned aerial vehicle 100 movement path; and/or a lower camera sensor 226 attached the body 210 of the unmanned aerial vehicle 100 so as to acquire image information of an area below the movement path of the unmanned aerial vehicle 100.

In one example, the controller 240 may apply altitude information of the unmanned aerial vehicle 100, acquired by the altitude sensor 224, to the extended Kalman filter. In another example, the controller 240 may calculate relative position information (or visual movement distance information), based on the image information of an area above the movement path, acquired by the upper camera sensor 225, and may apply the calculated relative position information to the extended Kalman filter. In another example, the controller 240 may calculate the lateral position and/or yaw angle of the unmanned aerial vehicle 100, based on the image information of an area below the movement path, acquired by the lower camera sensor 226, and may apply the calculated lateral position and/or yaw angle to the extended Kalman filter. A detailed description thereof will be made later.

Figure 4:
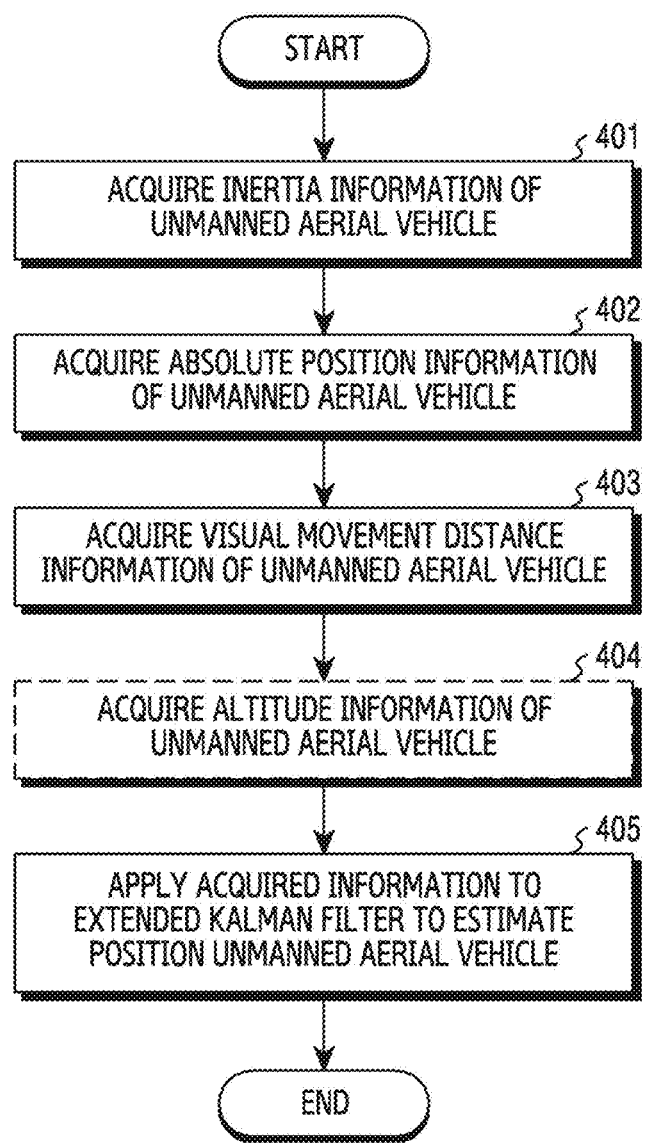
FIG. 4 is a flowchart illustrating operations of estimating the position of an unmanned aerial vehicle according to one embodiment.

FIG. 4 is a flowchart illustrating operations of estimating the position of an unmanned aerial vehicle according to one embodiment.

Figure 5A:
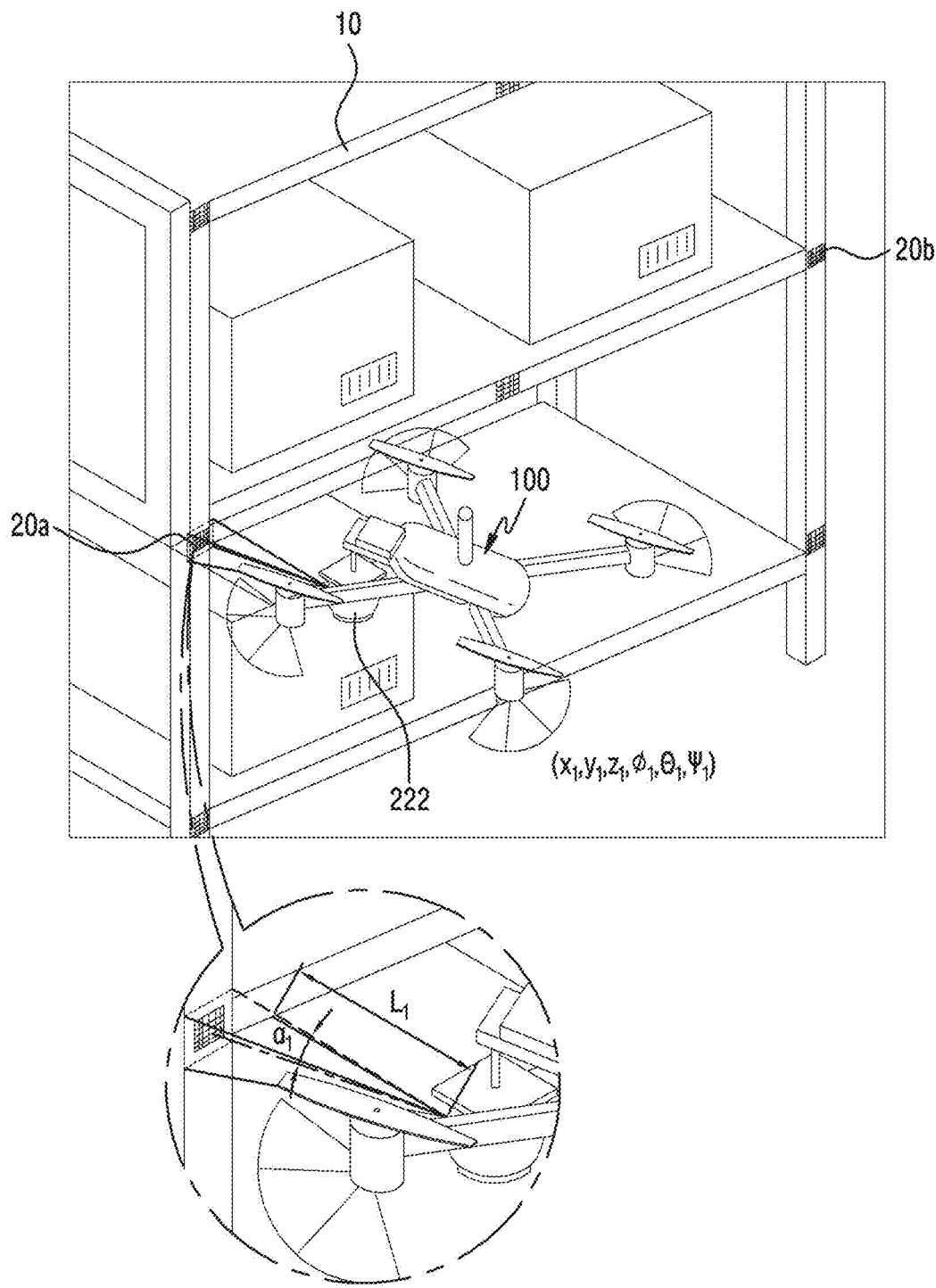
FIG. 5A is a perspective view illustrating an operation in which an unmanned aerial vehicle recognizes a tag according to one embodiment.
Figure 5B:
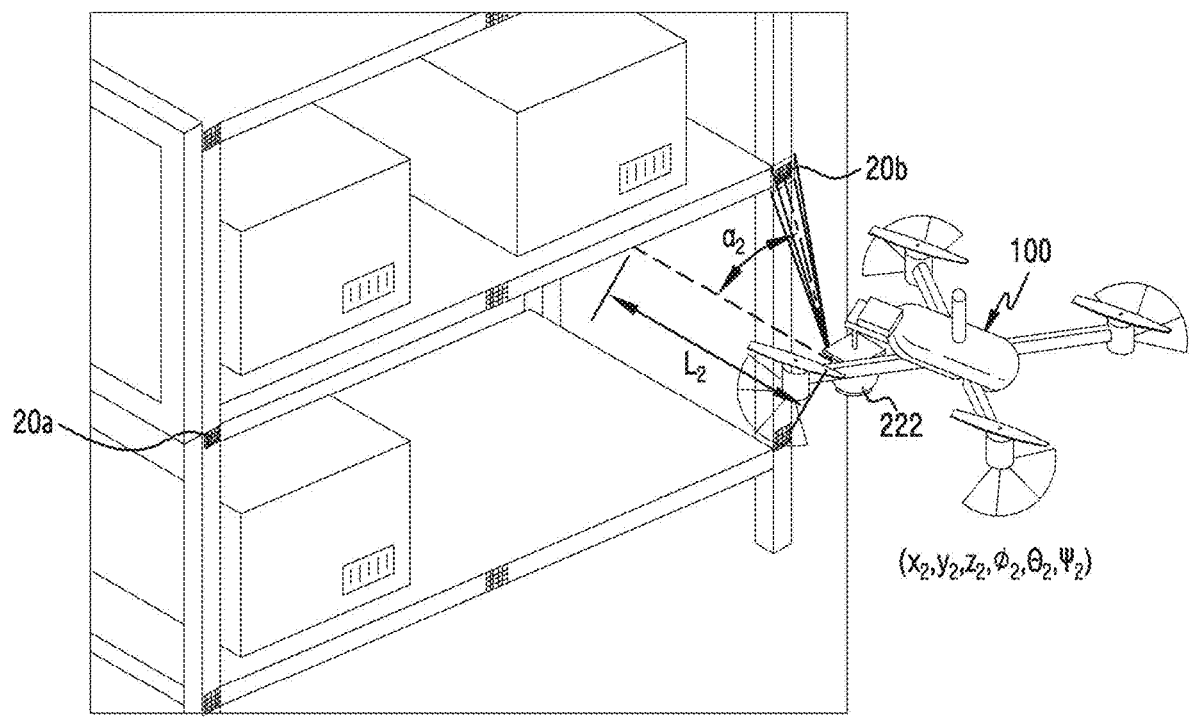
FIG. 5B is a perspective view illustrating an operation in which the unmanned aerial vehicle in FIG. 5A recognizes another tag at another angle.

FIG. 5A is a perspective view illustrating an operation in which an unmanned aerial vehicle 100 recognizes a tag 20a according to one embodiment. FIG. 5B is a perspective view illustrating an operation in which the unmanned aerial vehicle 100 in FIG. 5A recognizes another tag 20b at another angle.

Some (e.g. operation 402) of the unmanned aerial vehicle position estimation operations in FIG. 4 will be described with reference to FIGS. 5A and 5B.

Referring to FIG. 4, in operation 401, an inertia sensor (e.g. the inertia sensor 221 in FIG. 3) of an unmanned aerial vehicle (e.g. the unmanned aerial vehicle 100 in FIG. 2) according to one embodiment may acquire inertia information of the unmanned aerial vehicle, such as the acceleration or the angular velocity of the unmanned aerial vehicle. The acquired inertia information of the unmanned aerial vehicle may be transmitted to a controller (e.g. the controller 240 in FIG. 3).

Referring to FIGS. 5A and 5B, in operation 402, the tag recognition sensor 222 of the unmanned aerial vehicle 100 according to one embodiment may recognize multiple tags 20a and 20b attached to the rack 10 at a designated portion thereof, and the controller may acquire absolute position information of the unmanned aerial vehicle 100, based on the tag recognition information acquired by the tag recognition sensor 222. According to one embodiment, when the multiple tags 20a and 20b are recognized by the tag recognition sensor 222, the controller may acquire pose data, including information on the position and angle of the tags 20a and 20b relative to the tag recognition sensor 22, through a recognition algorithm. That is, the controller may acquire, through a previously given tag map, different types of absolute position information depending on the distance between the tag recognition sensor 222 and the tags 20a and 20b and the angle between the tag recognition sensor 222 and the tags.

In one example, referring to FIG. 5A, when the distance between the tag recognition sensor 222 of the unmanned aerial vehicle 100 and the tag 20a is $L_1$ and the angle between the tag recognition sensor 222 and the tag 20a is $\alpha_1$, the controller may acquire, based on the tag recognition information acquired by the tag recognition sensor 222, information indicating that the current absolute position of the unmanned aerial vehicle 100 is $(x_1, y_1, z_1, \emptyset_1, \theta_1, \Psi_1)$. In the disclosure, $\emptyset$ denotes the roll angle of the unmanned aerial vehicle 100, $\theta$ denotes the pitch angle of the unmanned aerial vehicle 100, and $\Psi$ denotes the yaw angle of the unmanned aerial vehicle 100. Hereinafter, the above signs may be used while having the same meaning.

In another example, referring to FIG. 5B, when the distance between the tag recognition sensor 222 of the unmanned aerial vehicle 100 and the tag 20a is $L_2$ and the angle between the tag recognition sensor 222 and the tag 20a is $\alpha_2$, the controller may acquire, based on the tag recognition information acquired by the tag recognition sensor 222, information indicating that the current absolute position of the unmanned aerial vehicle 100 is $(x_2, y_2, z_2, \emptyset_2, \theta_2, \Psi_2)$.

In operation 403, the controller of the unmanned aerial vehicle according to one embodiment may acquire, based on the information acquired by the sensor part, visual movement distance information of the unmanned aerial vehicle, that is, relative position information thereof. In one example, the controller may acquire the visual movement distance information (or relative position information) of the unmanned aerial vehicle by applying the inertia information of the unmanned aerial vehicle, acquired by the inertia sensor, and movement environment image information acquired by an image sensor (e.g. the image sensor 223 in FIG. 3) to hector SLAM which is a type of scan matching technique. In another example, the controller may also acquire another type of visual movement distance information, based on image information of an area above the movement path of the unmanned aerial vehicle which has been acquired by an upper camera sensor (e.g. the upper camera sensor 225 in FIG. 3). However, a detailed description thereof will be made later.

In operation 404, an altitude sensor (e.g. the altitude sensor 224 in FIG. 3) of the unmanned aerial vehicle according to one embodiment may acquire information on the current altitude of the unmanned aerial vehicle. The altitude information acquired by the altitude sensor may be transmitted to the controller.

In operation 405, the controller of the unmanned aerial vehicle according to one embodiment may apply the information acquired in operations 401 to 404 to an extended Kalman filter to estimate the position of the unmanned aerial vehicle. In one example, the controller may estimate the current position of the unmanned aerial vehicle by using the inertia information acquired in operation 401 to perform state update of the extended Kalman filter and using the absolute position information, the visual movement distance information, and/or the altitude information, acquired in operations 402 to 404, to perform a measurement update. Operations 401, 402, 403, and 404 are not required to be necessarily performed in order. According to an embodiment, operations 401, 402, 403, and 404 may be simultaneously performed, and a specific operation may be first performed.

Figure 6:
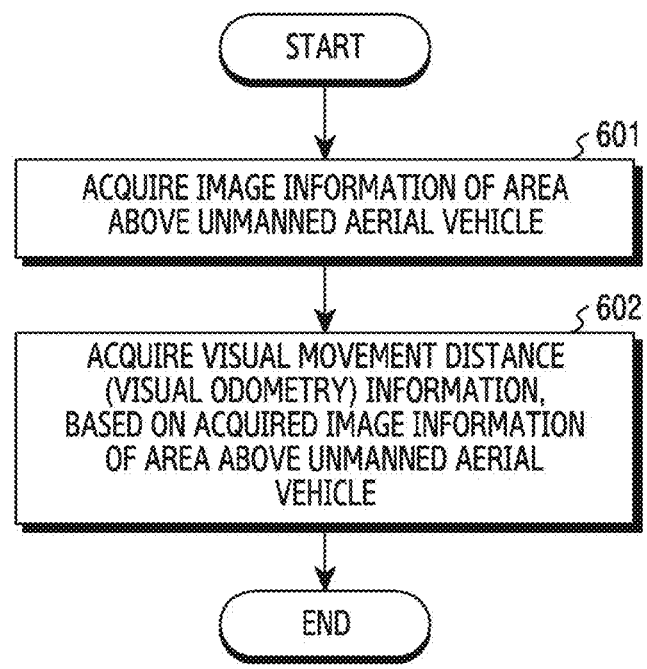
FIG. 6 is a flowchart illustrating a process of acquiring visual movement distance (visual odometry) information of an unmanned aerial vehicle according to according to one embodiment.

FIG. 6 is a flowchart illustrating a process of acquiring visual movement distance (visual odometry) information of an unmanned aerial vehicle according to according to one embodiment.

Referring to FIG. 6, in operation 601, an upper camera sensor (e.g. the upper camera sensor 225 in FIG. 3) of an unmanned aerial vehicle (e.g. the unmanned aerial vehicle 100 in FIG. 2) according to one embodiment may acquire image information of an area above an unmanned aerial vehicle movement path. The acquired image information of an area above the movement path may be transmitted to a controller (e.g. the controller 240 in FIG. 3).

In operation 602, the controller of the unmanned aerial vehicle according to one embodiment may acquire visual movement distance (visual odometry) information or relative position information of the unmanned aerial vehicle, based on the image information of an area above the unmanned aerial vehicle movement path, acquired in operation 601.

According to one embodiment, the controller may acquire relative position (relative 6D pose) of the unmanned aerial vehicle by applying the upper-end image information of the unmanned aerial vehicle movement path, acquired in operation 601, to a visual SLAM algorithm. The visual SLAM (or VSLAM) refers to a process of recognizing and mapping the position of an object by using visual data or images. In the visual SLAM, it is possible to extract important points on visual data or images as matching points and to track the position of an object, based on the matching points. In one example (see FIG. 12A or 12B described later), the controller may acquire the relative position information of the unmanned aerial vehicle by using oriented fast and rotated brief-SLAM (ORB-SLAM) during the visual SLAM, but is not limited thereto. That is, as described, the controller may acquire the relative position information (or visual movement distance information), based on inertia information and movement environment image of the unmanned aerial vehicle, and may acquire the relative position information, based on the upper-end image information of the unmanned aerial vehicle movement path.

The controller may apply the relative position information of the unmanned aerial vehicle, acquired in operation 602, to an extended Kalman filter to increase the accuracy of estimation of the position of the unmanned aerial vehicle. According to an embodiment, the controller may apply, to the extended Kalman filter, only world coordinate information and yaw angle information among the relative position information of the unmanned aerial vehicle, acquired in operation 602, but is not limited thereto.

Figure 7:
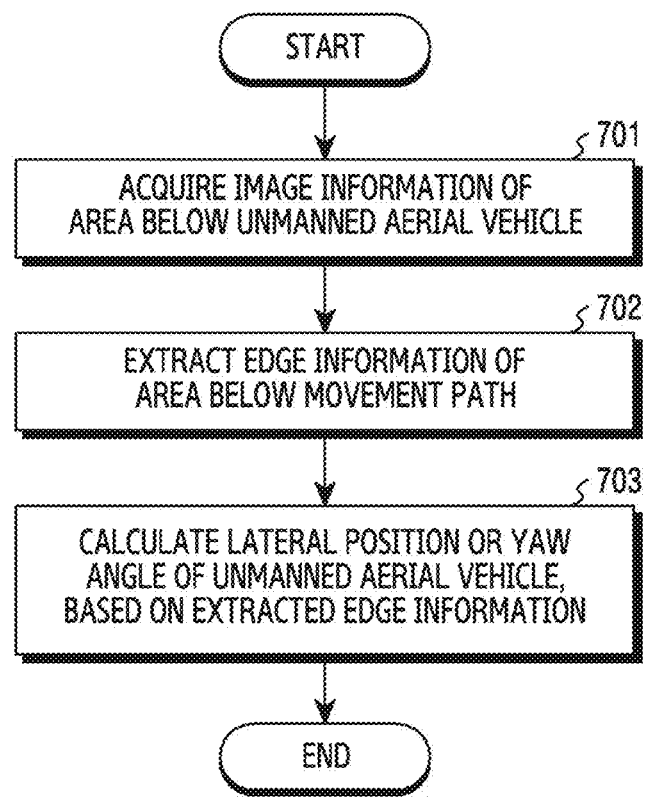
FIG. 7 is a flowchart illustrating a process of calculating the lateral position and yaw angle of an unmanned aerial vehicle according to one embodiment.

FIG. 7 is a flowchart illustrating a process of calculating the lateral position and yaw angle of an unmanned aerial vehicle according to one embodiment.

Figure 8A:
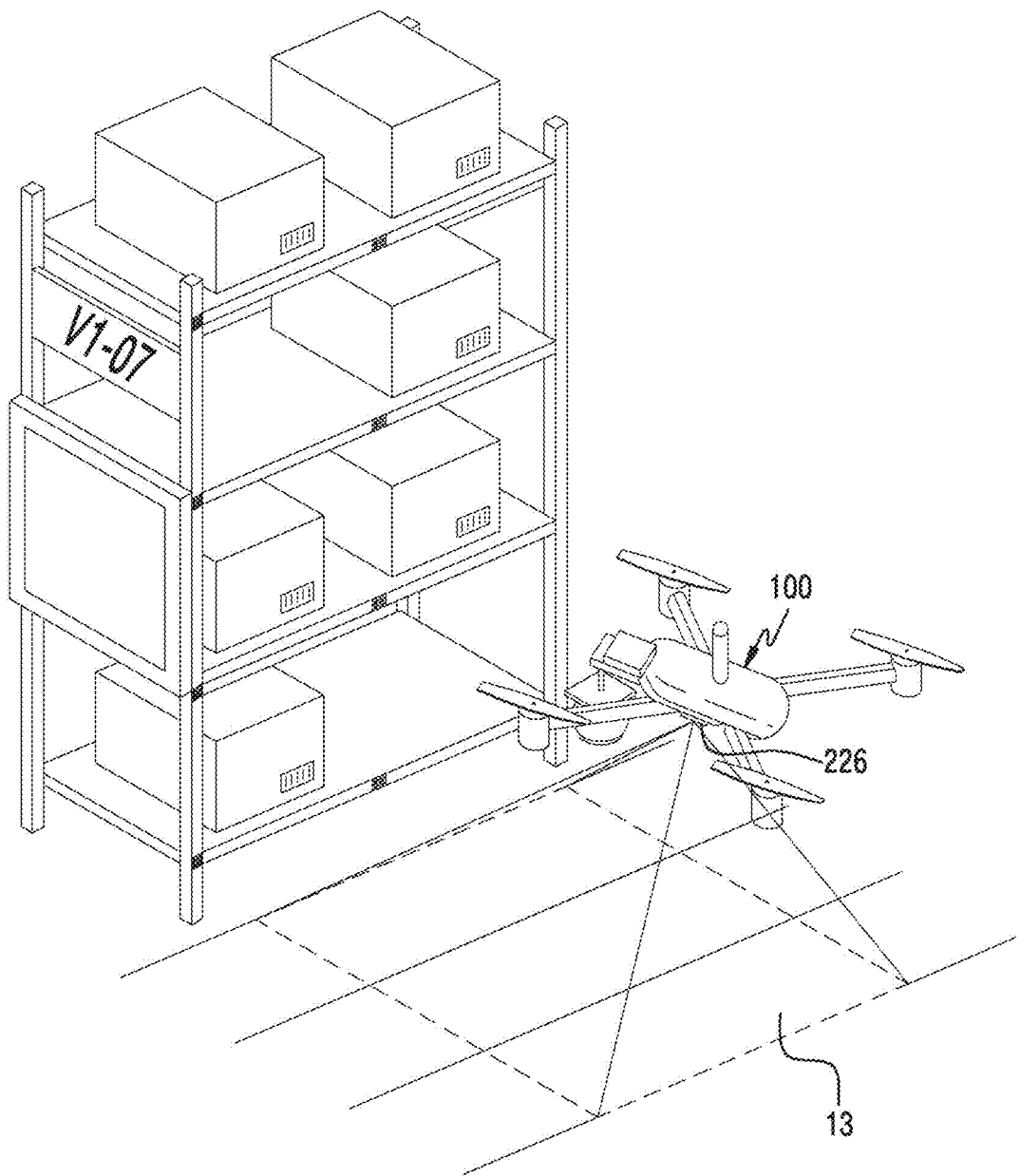
FIG. 8A is a perspective view illustrating a process in which an unmanned aerial vehicle acquires an image of an area below a movement path according to one embodiment.
Figure 8B:
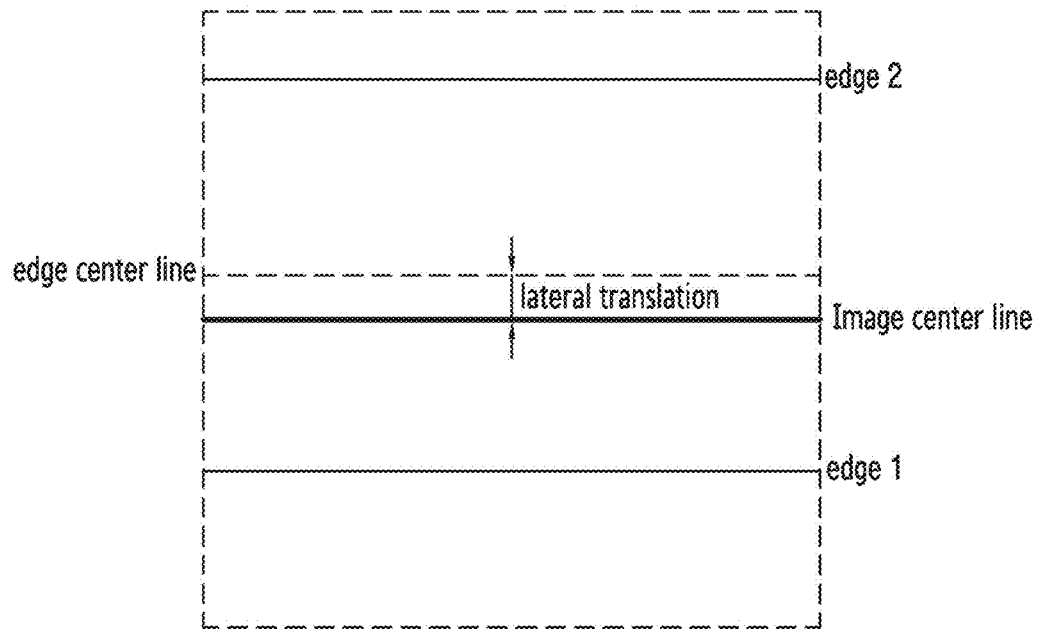
FIG. 8B illustrates a process of calculating a lateral position based on information on an edge of a movement path.
Figure 8C:
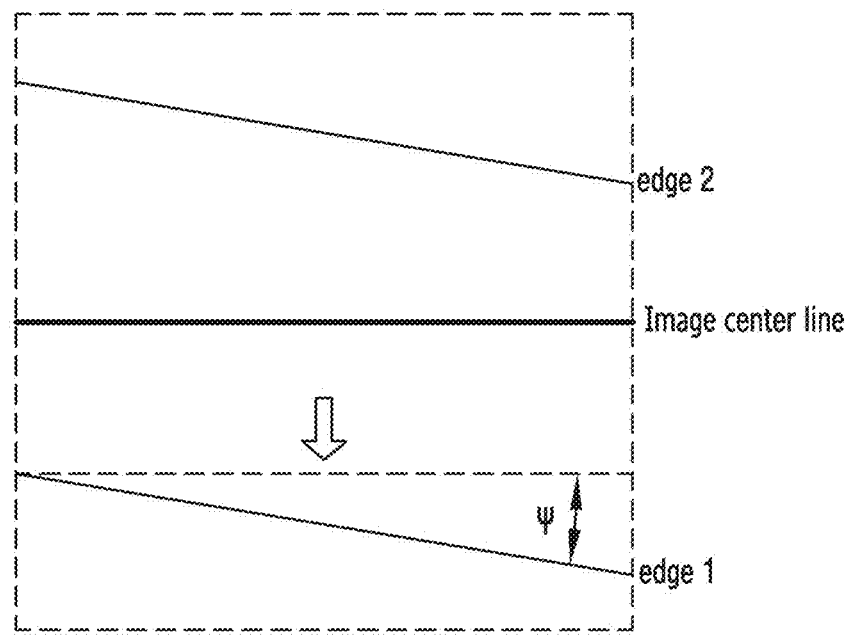
FIG. 8C illustrates a process of calculating a yaw angle, based on information on an edge of a movement path.

FIG. 8A is a perspective view illustrating a process in which the unmanned aerial vehicle 100 acquires an image of an area below a movement path according to one embodiment. FIG. 8B illustrates a process of calculating a lateral position based on information on an edge of a movement path. FIG. 8C illustrates a process of calculating a yaw angle, based on information on an edge of a movement path.

The operation of calculating the lateral position and yaw angle of an unmanned aerial vehicle, in FIG. 7, will be described with reference to FIGS. 8A, 8B, and 8C.

Referring to FIGS. 7, 8A, 8B, and 8C, in operation 701, the unmanned aerial vehicle according to one embodiment may acquire image information of an area below the movement path of the unmanned aerial vehicle 100 through the lower camera sensor 226.

According to one embodiment, as illustrated in FIG. 8A, the unmanned aerial vehicle 100 may move along an aisle 13 formed between racks 10, and the lower camera sensor 226 is installed at the bottom of the body 210 of the unmanned aerial vehicle 100 so as to acquire an image of an area below the movement path of the unmanned aerial vehicle 100, that is, an image of the floor of the aisle 13.

In operation 702, a controller of the unmanned aerial vehicle according to one embodiment may extract edge information from the image information of an area below the movement path of the unmanned aerial vehicle 100, which has been acquired in operation 701. According to one embodiment (see FIG. 8B or 8C), the controller may extract information on a left edge (edge 1) and a right edge (edge 2) of the aisle 13 from the image information of an area below the movement path of the unmanned aerial vehicle 100 through fast Fourier transform (FFT) and likelihood calculation processes.

In operation 703, the controller of the unmanned aerial vehicle according to one embodiment may calculate, based on the edge information extracted in operation 702, the lateral position of the unmanned aerial vehicle 100 and/or the yaw angle of the unmanned aerial vehicle 100, Referring to FIG. 8B, according to one embodiment, the controller may compare a virtual center line on the image of an area below the movement path of the unmanned aerial vehicle 100 (image center line) with a virtual center line between a left edge (edge 1) and a right edge (edge 2) (edge center line), so as to calculate the lateral position of the unmanned aerial vehicle with reference to the center of the aisle 13.

Referring to FIG. 8C, according to another embodiment, the controller may calculate, as a yaw angle ($\Psi$), the angle between the virtual center line on the image of an area below the movement path of the unmanned aerial vehicle 100 (image center line) and the left edge (edge 1) or the right edge (edge 2).

The lateral position or yaw angle of the unmanned aerial vehicle 100 may be estimated as a position or angle which is different from an actual position or an actual yaw angle due to uncertainty of a system of the unmanned aerial vehicle 100 or uncertainty of a sensor part (e.g. the sensor part 220 in FIG. 3) thereof. In this case, even though the unmanned aerial vehicle 100 stably moves along a designated movement path, the controller may have no choice but to control the unmanned aerial vehicle 100 such that the movement direction of the unmanned aerial vehicle 100 is changed to the left or right direction in order to ensure the stability of the unmanned aerial vehicle 100. The unmanned aerial vehicle 100 may collide with the rack 10 in the above-described control process, and thus may be broken or may move along a path which is different from the designated movement path. According to one embodiment, the controller may apply the lateral position and/or yaw angle of the unmanned aerial vehicle 100, calculated in operation 703, to an extended Kalman filter, and may efficiently remove a drift of a position estimation value of the unmanned aerial vehicle 100 through the above-described process.

Figure 9:
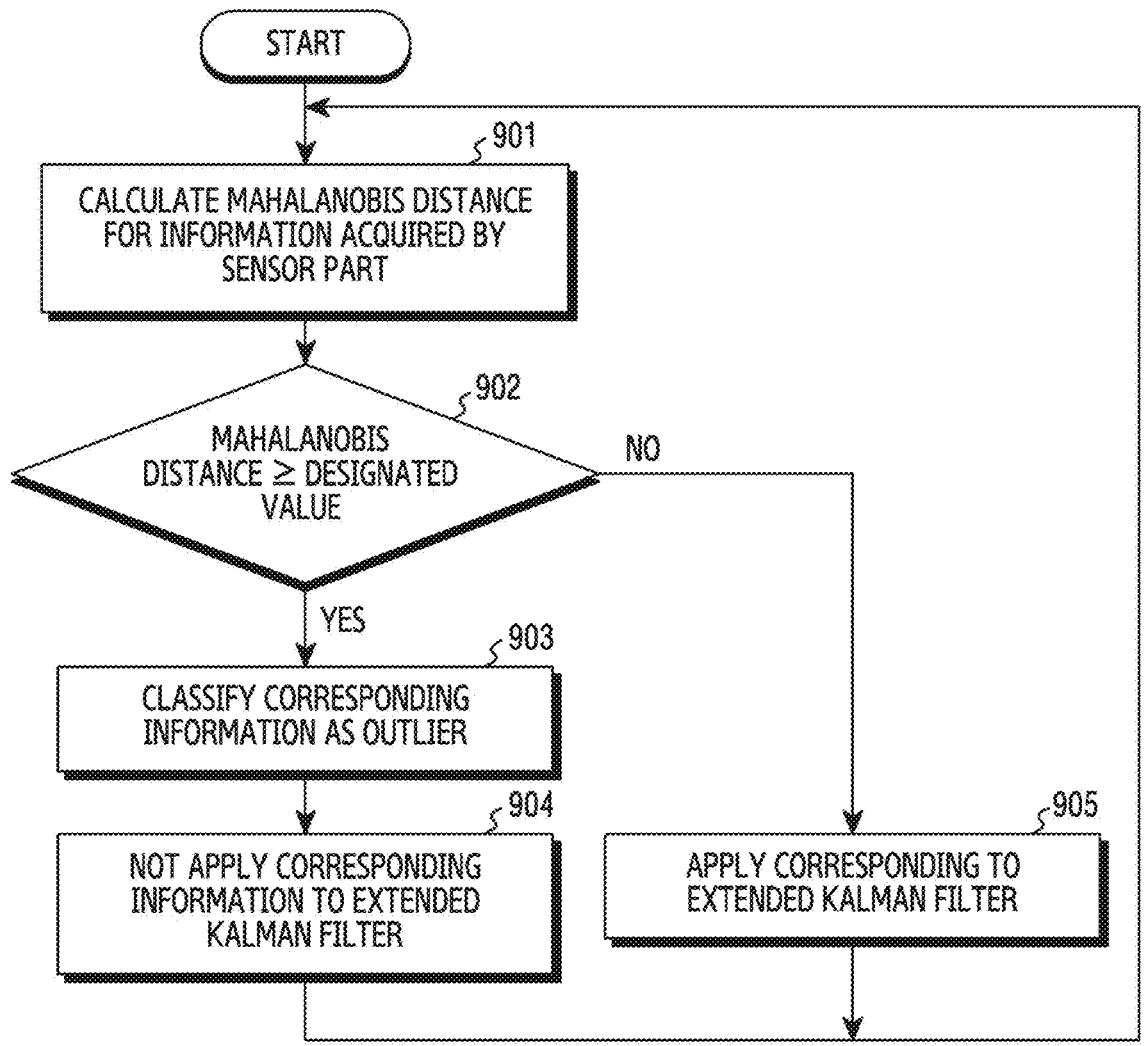
FIG. 9 is a flow chart illustrating a process in which an unmanned aerial vehicle classifies information acquired by a sensor part as an outlier according to one embodiment.

FIG. 9 is a flow chart illustrating a process in which an unmanned aerial vehicle classifies information acquired by a sensor part as an outlier according to one embodiment.

Referring to FIG. 9, in operation 901, a controller (e.g. the controller 240 in FIG. 3) of an unmanned aerial vehicle (e.g. the unmanned aerial vehicle 100 in FIG. 2) according to one embodiment may continuously calculate a Mahalanobis distance for absolute position information or relative position information of the unmanned aerial vehicle, which has been directly or indirectly acquired through a sensor part (e.g. the sensor part 220 in FIG. 3). The Mahalanobis distance in the disclosure denotes a value indicating how many times the standard deviation is far from the average value. The controller may calculate a Mahalanobis distance M for information acquired by the sensor part by using Equation 9 below.

$$M^2 = (z - H\hat{x})^T S^{-1} (z - H\hat{x}) \qquad \text{[Equation 9]}$$

Herein, z denotes a measurement vector; H denotes a linearized measurement matrix; S denotes a state covariance matrix; and $\hat{x}$ denotes a state prediction value.

In operation 902, the controller of the unmanned aerial vehicle according to one embodiment may compare a designated value (threshold) with the Mahalanobis distance, calculated in operation 901, for the information acquired by the sensor part. In one example, the controller may compare a designated value with a Mahalanobis distance for information on the yaw angle, pitch angle, or roll angle of the unmanned aerial vehicle which has been acquired through a tag recognition sensor (e.g. the tag recognition sensor 222 in FIG. 3). In another example, the controller may compare a designated value with the Mahalanobis distance for information on the lateral position or yaw angle of the unmanned aerial vehicle, which has been calculated through the calculation process of FIG. 7. That is, the controller may compare a Mahalanobis distance for specific information with the designated value to determine whether the specific information is proper information.

In operation 903, when it is determined in operation 902 that the Mahalanobis distance for specific information (e.g. a lateral position or a yaw angle) is equal to or greater than the designated value, the controller of the unmanned aerial vehicle according to one embodiment may classify the corresponding information as an outlier (or an abnormal value). In one example, when a Mahalanobis distance for lateral position information of the unmanned aerial vehicle is equal to or greater than the designated value, the controller may classify the lateral position information as an outlier. According to one embodiment, the designated value may be differently configured depending on the type of information. In one example, a designated value for a lateral position information and a designated value for yaw angle information may be configured to be different from each other, but are not limited thereto.

In operation 904, by not applying the information classified as an outlier in operation 930 to an extended Kalman filter, the controller of the unmanned aerial vehicle according to one embodiment may remove the outlier in the process of estimating the position of the unmanned aerial vehicle.

When it is determined, in operation 902, that the Mahalanobis distance for specific information is smaller than the designated value, the controller according to one embodiment may determine that the corresponding information is normal data. In operation 905, the controller may apply the corresponding information to the extended Kalman filter to increase the accuracy of estimation of the position of the unmanned aerial vehicle.

That is, the unmanned aerial vehicle according to one embodiment may continuously calculate a Mahalanobis distance for position information of the unmanned aerial vehicle which is acquired through the sensor part, and may determine whether the specific position information is an outlier, based on the calculated Mahalanobis distance. By not applying the position information classified as an outlier to an extended Kalman filter, the unmanned aerial vehicle may remove an outlier caused by uncertainty of the sensor part in an unmanned aerial vehicle position estimation process.

Figure 10A:
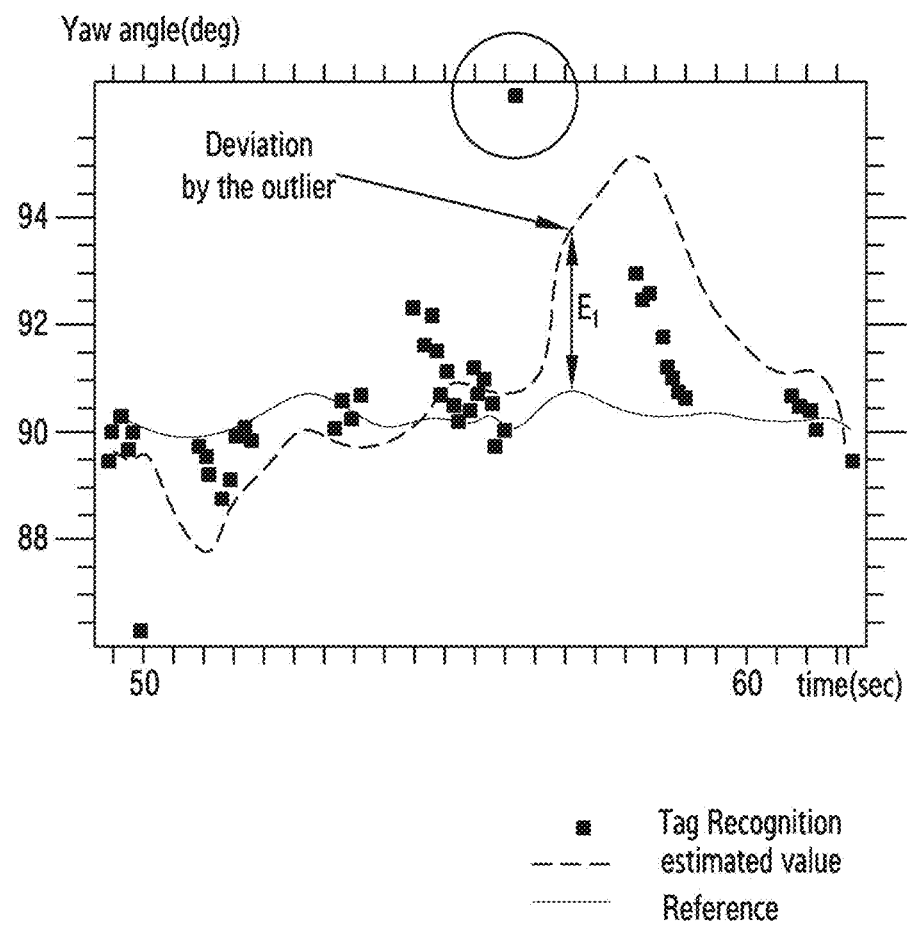
FIG. 10A is a graph showing the result of estimating the yaw angle of an unmanned aerial vehicle in the state in which an outlier is not removed.
Figure 10B:
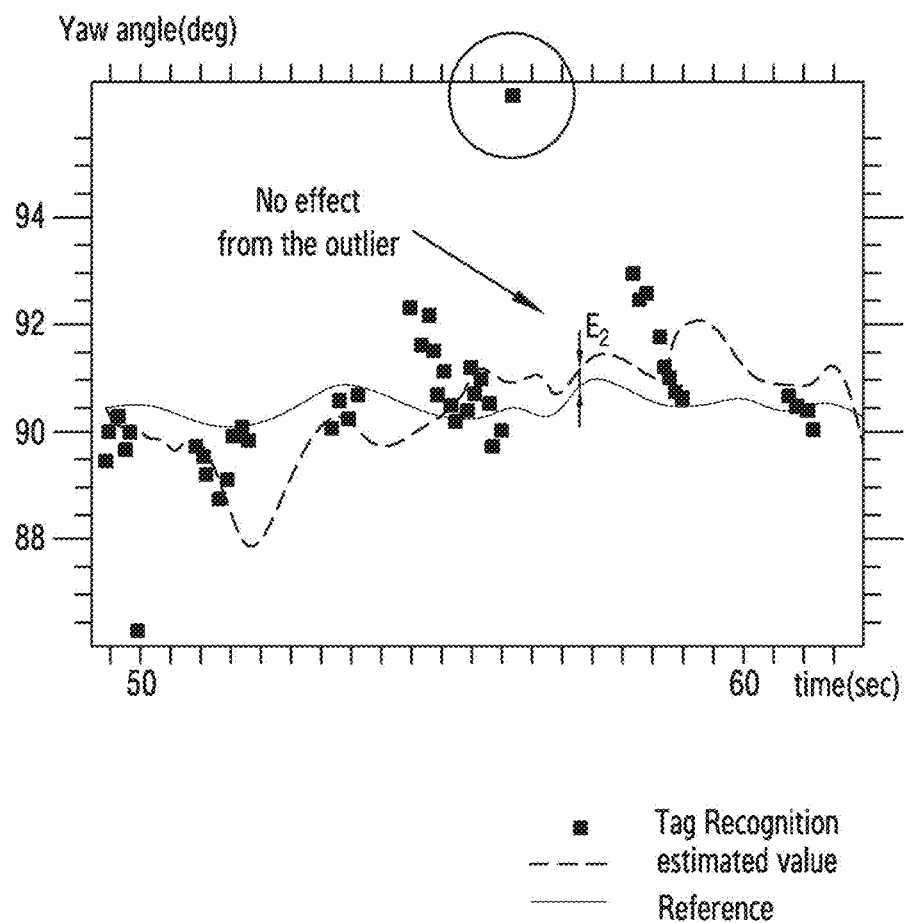
FIG. 10B is a graph showing the result of estimating the yaw angle of an unmanned aerial vehicle in the state in which an outlier is removed.

FIG. 10A is a graph showing the result of estimating the yaw angle of an unmanned aerial vehicle in the state in which an outlier is not removed. FIG. 10B is a graph showing the result of estimating the yaw angle of an unmanned aerial vehicle in the state in which an outlier is removed.

An unmanned aerial vehicle (e.g. the unmanned aerial vehicle 100 in FIG. 2) may acquire absolute position information of the unmanned aerial vehicle through a tag recognition sensor (e.g. the tag recognition sensor 222 in FIG. 3), and may apply the acquired absolute position information to an extended Kalman filter to estimate the position of the unmanned aerial vehicle. In one example, the unmanned aerial vehicle may apply yaw angle information of the unmanned aerial vehicle, which has been acquired through the tag recognition sensor, to the extended Kalman filter to estimate the yaw angle of the unmanned aerial vehicle. According to one embodiment, the unmanned aerial vehicle may calculate a Mahalanobis distance for the yaw angle information before applying the yaw angle information to the extended Kalman filter. The unmanned aerial vehicle may determine, based on the calculated Mahalanobis distance, whether the yaw angle information is an outlier, and may apply the yaw angle information to the extended Kalman filter only when it is determined that the yaw angle information is not an outlier.

Referring to FIG. 10A, when all types of yaw angle information of the unmanned aerial vehicle, which has been acquired by the tag recognition sensor, is indiscriminately applied to the extended Kalman filter, a gross error E1 may occur between an estimated yaw angle value of the extended Kalman filter and a reference value by a value of an outlier. On the other hand, referring to FIG. 10B, when only yaw angle information of the unmanned aerial vehicle, which has been acquired by the tag recognition sensor and from which an outlier has been excluded, is applied to the extended Kalman filter, an error E2 between an estimated yaw angle value of the extended Kalman filter and a reference value may become smaller than an error (e.g. E1 in FIG. 10A) caused when the outlier is not removed. That is, as described above, the unmanned aerial vehicle may more accurately estimate the current position of the unmanned aerial vehicle by removing information corresponding to an outlier from information acquired by a sensor part.

Figure 11:
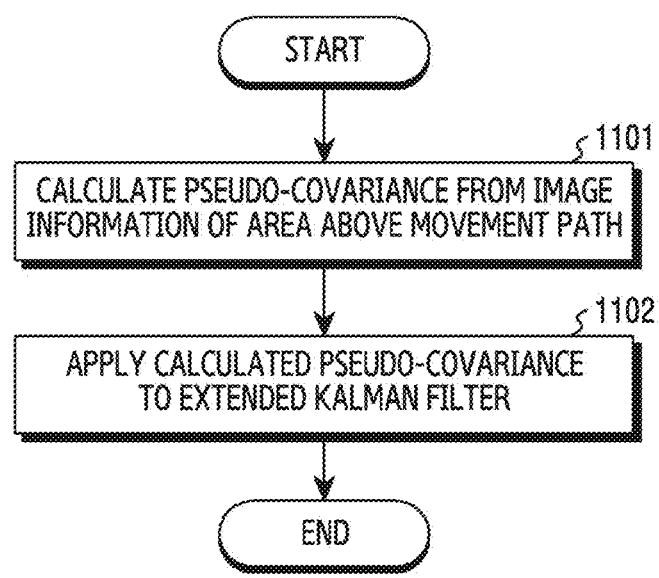
FIG. 11 is a flowchart illustrating a process in which an unmanned aerial vehicle calculates pseudo-covariance from a visual SLAM algorithm and applies the calculated pseudo-covariance to an extended Kalman filter according to one embodiment.

FIG. 11 is a flowchart illustrating a process in which an unmanned aerial vehicle calculates pseudo-covariance from a visual SLAM algorithm and applies the calculated pseudo-covariance to an extended Kalman filter according to one embodiment.

Figure 12A:
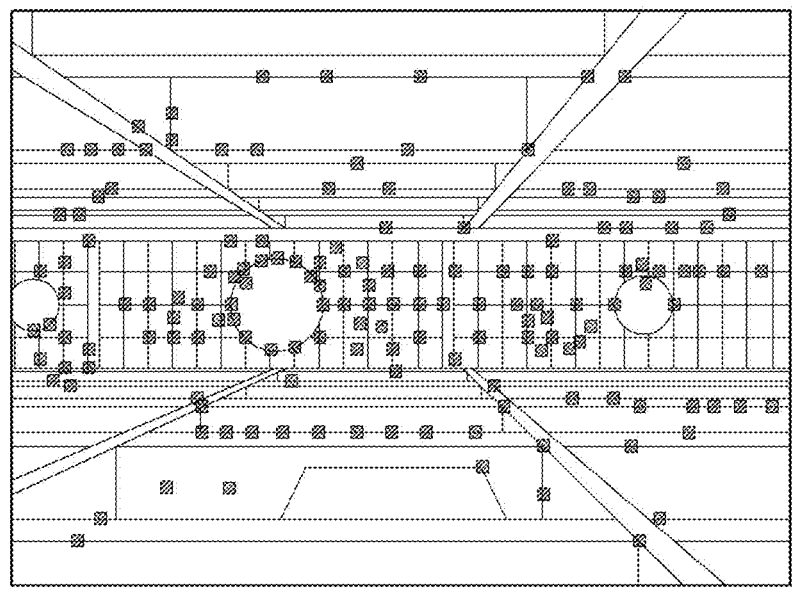
FIG. 12A illustrates a process in which an unmanned aerial vehicle extracts a matching point of a visual SLAM algorithm according to one embodiment.
Figure 12B:
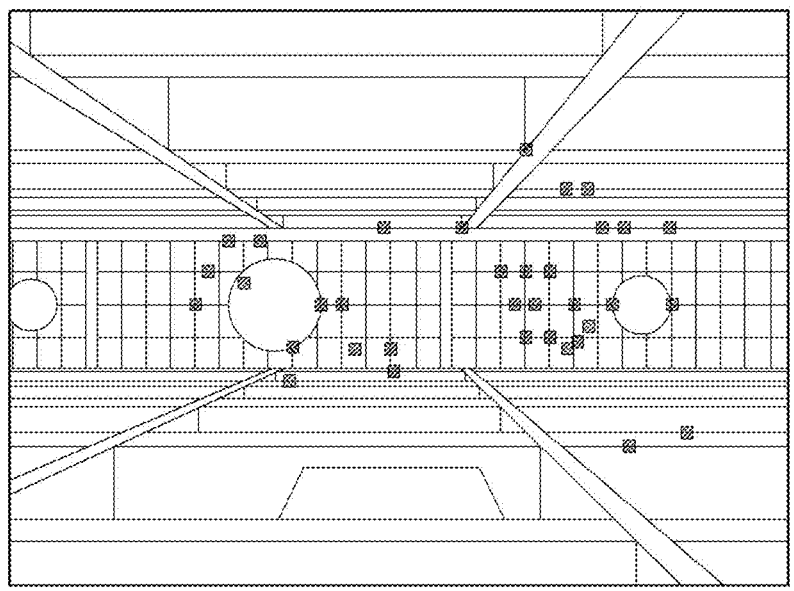
FIG. 12B illustrates a process in which an unmanned aerial vehicle extracts a matching point according to another embodiment.

FIG. 12A illustrates a process in which an unmanned aerial vehicle extracts a matching point of a visual SLAM algorithm according to one embodiment. FIG. 12B illustrates a process in which an unmanned aerial vehicle extracts a matching point according to another embodiment.

An operation of calculating a pseudo-covariance in FIG. 11 will be described with reference to FIGS. 12A and 12B.

Referring to the above-described process of acquiring visual movement distance (visual odometry) information of an unmanned aerial vehicle (e.g. the unmanned aerial vehicle 100 in FIG. 2) in FIG. 6, the unmanned aerial vehicle may apply image information of an area above a movement path, which has acquired through an upper camera sensor (e.g. the upper camera sensor 225 in FIG. 3), to a visual SLAM algorithm to acquire visual movement distance information (or relative position information) of the unmanned aerial vehicle.

A disturbance may occur during the flight of the unmanned aerial vehicle. According to one embodiment, the unmanned aerial vehicle may generate pseudo-covariance through a visual SLAM so as to minimize the influence of the disturbance occurring during the flight of the unmanned aerial vehicle.

Referring to FIG. 11, in operation 1101, a controller of an unmanned aerial vehicle according to one embodiment may apply image information of an area above an unmanned aerial vehicle movement path, acquired by an upper camera sensor, to a visual SLAM algorithm, and may generate pseudo-covariance, based on matching points which are located in an image of an area above the unmanned aerial vehicle movement path and are extracted through the visual SLAM algorithm.

Referring to FIG. 12A or 12B, the controller of the unmanned aerial vehicle according to one embodiment may apply the image information of an area above the unmanned aerial vehicle movement path to an ORB-SLAM algorithm which is a type of visual SLAM. As a result of the ORB-SLAM, multiple matching points (e.g. the black points in FIGS. 12A and 12B) may be extracted from the image information of an area above the movement path, and the controller according to one embodiment may generate pseudo-covariance by using the number of matching points extracted from the image information of an area above the movement path as a result of the ORB-SLAM. That is, the controller may generate different pseudo-covariance depending on the number of matching points extracted from the image information of an area above the movement path.

In one example (FIG. 12A), the controller may generate first pseudo-covariance when the number of matching points extracted from the image information of an area above the movement path is N1. In another example (FIG. 12B), the controller may generate second pseudo-covariance when the number of matching points extracted from the image information of an area above the movement path is N2.

In operation 1102, the controller of the unmanned aerial vehicle according to one embodiment may apply the pseudo-covariance generated in operation 1101 to an extended Kalman filter to minimize influence of a disturbance, which occurs during upward or downward movement of the unmanned aerial vehicle, on the result of estimating of the position of the unmanned aerial vehicle.

As described above, covariance is necessary for applying specific information (e.g. lateral position or yaw angle information of the unmanned aerial vehicle) to an extended Kalman filter. However, as a result of visual SLAM (e.g. the ORB-SLAM) algorithm, covariance data about the specific information is not provided. Therefore, the unmanned aerial vehicle according to one embodiment may generate pseudo-covariance through operation 1101, and may apply the generated pseudo-covariance to an extended Kalman filter through operation 1102.

Figure 13A:
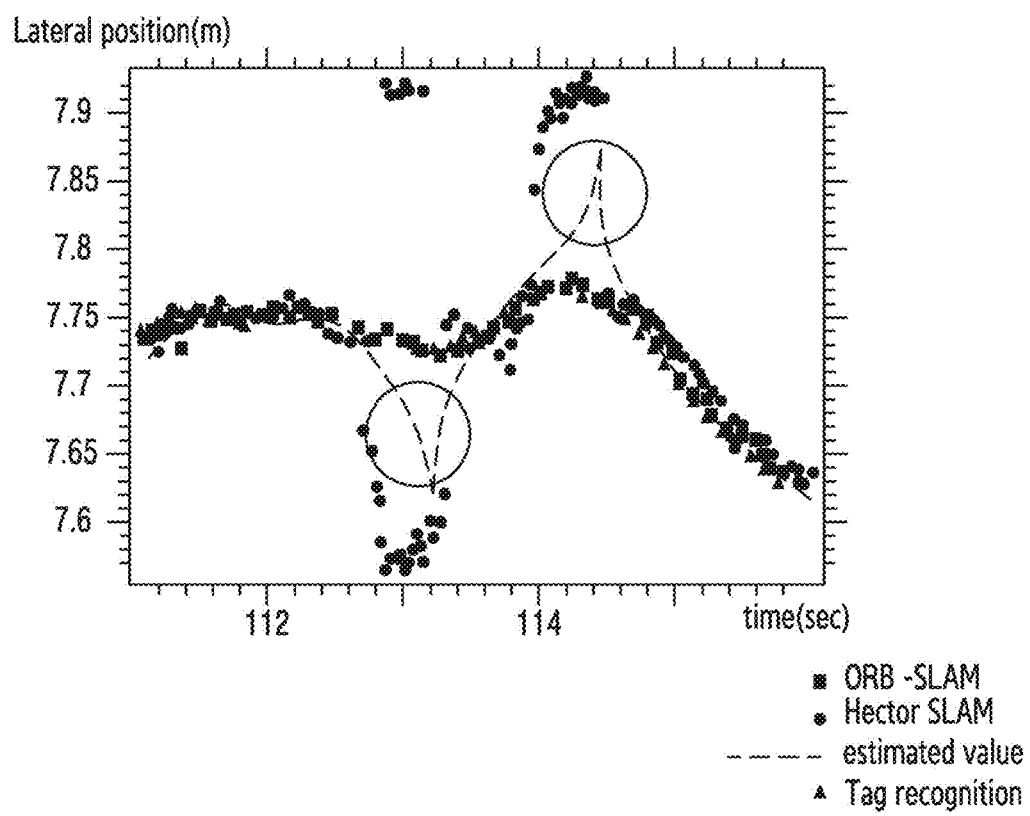
FIG. 13A is a graph showing the result of estimating the lateral position of an unmanned aerial vehicle in the state where pseudo-covariance is not applied to an extended Kalman filter.
Figure 13B:
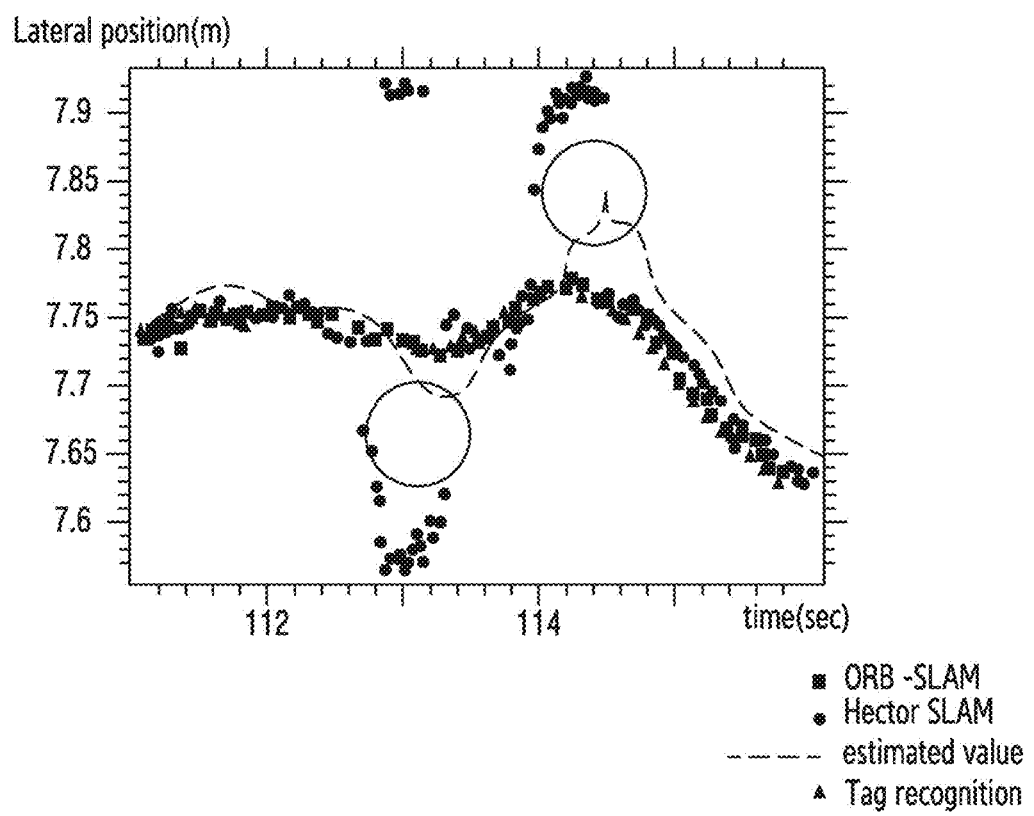
FIG. 13B is a graph showing the result of estimating the lateral position of an unmanned aerial vehicle in the state where pseudo-covariance is applied to an extended Kalman filter.

FIG. 13A is a graph showing the result of estimating the lateral position of an unmanned aerial vehicle in the state where pseudo-covariance is not applied to an extended Kalman filter. FIG. 13B is a graph showing the result of estimating the lateral position of an unmanned aerial vehicle in the state where pseudo-covariance is applied to an extended Kalman filter.

An unmanned aerial vehicle (e.g. the unmanned aerial vehicle 100 in FIG. 2) according to one embodiment may acquire lateral position information of the unmanned aerial vehicle, based on image information of an area above a movement path, which has been acquired through an upper camera sensor (e.g. the upper camera sensor 225 in FIG. 3). The acquiring of the lateral position information of the unmanned aerial vehicle is the same as or similar to acquiring visual movement distance (visual odometry) information of an unmanned aerial vehicle in FIG. 6, and thus will be described while a redundant description thereof is omitted.

A disturbance is likely to occur while the unmanned aerial vehicle moves up and down in the vertical direction. The disturbance may affect the result of estimating the position of the unmanned aerial vehicle. The unmanned aerial vehicle according to one embodiment may calculate pseudo-covariance through the above-described pseudo-covariance calculation process of FIG. 11, and may apply the calculated pseudo-covariance to an extended Kalman filter to reduce an influence of the disturbance.

Referring to FIG. 13A, when pseudo-covariance is not applied to an extended Kalman filter, a significant error may occur between an estimated value of the lateral position of the unmanned aerial vehicle, acquired through the extended Kalman filter at the time of upward or downward movement of the unmanned aerial vehicle, and lateral position information acquired through ORB-SLAM or tag recognition.

On the other hand, referring to FIG. 13B, when pseudo-covariance is applied to an extended Kalman filter, an error between an estimated value of the lateral position of the unmanned aerial vehicle, acquired through the extended Kalman filter at the time of upward or downward movement of the unmanned aerial vehicle, and lateral position information acquired through ORB-SLAM or tag recognition may become smaller than an error occurring when the pseudo-covariance is not applied to the extended Kalman filter (e.g. FIG. 13A). That is, according to the graphs in FIGS. 13A and 13B, it is determined that generating pseudo-covariance of the unmanned aerial vehicle according to one embodiment and applying the generated pseudo-covariance to an extended Kalman filter may reduce an influence of a disturbance which may occur during estimation of the position of the unmanned aerial vehicle.

Figure 14A:
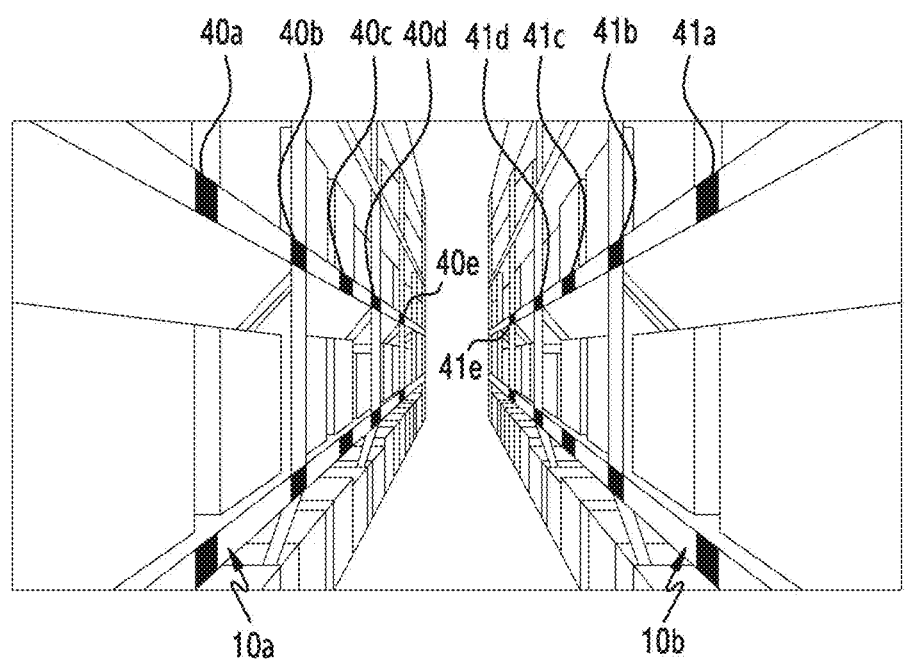
FIG. 14A illustrates a tag attachment position necessary for determining the absolute position of an unmanned aerial vehicle when the unmanned aerial vehicle recognizes only a front tag.
Figure 14B:
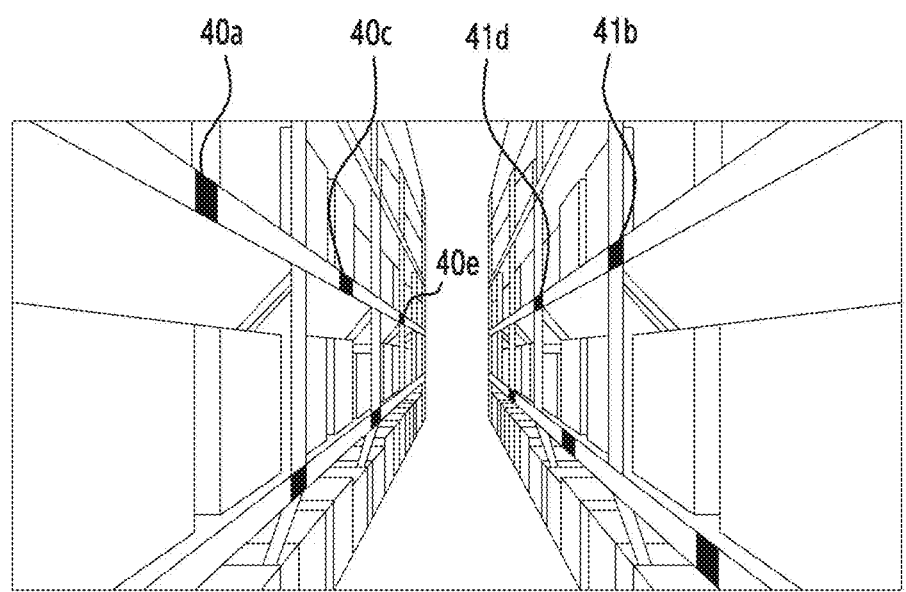
FIG. 14B illustrates a tag attachment position necessary for determining the absolute position of an unmanned aerial vehicle when the unmanned aerial vehicle recognizes both a front tag and a rear tag.

FIG. 14A illustrates a tag attachment position necessary for determining the absolute position of an unmanned aerial vehicle when the unmanned aerial vehicle recognizes only a front tag. FIG. 14B illustrates a tag attachment position necessary for determining the absolute position of an unmanned aerial vehicle when the unmanned aerial vehicle recognizes both a front tag and a rear tag.

An unmanned aerial vehicle (e.g. the unmanned aerial vehicle 100 in FIG. 2) according to one embodiment may include: a first tag recognition sensor configured to recognize a tag 40a, 40b, 40c, 40d, or 40e, which is located in front of the unmanned aerial vehicle; and a second tag recognition sensor configured to recognize a tag 41a, 41b, 41c, 41d, or 41e, which is located behind the unmanned aerial vehicle.

Referring to FIG. 14A, when one tag recognition sensor is provided at the unmanned aerial vehicle according to one embodiment and is capable of recognizing only one of a front tag or a rear tag, a (1-1)th tag 40a, a (1-2)th tag 40b, a (1-3)th tag 40c, a (1-4)th tag 40d, and a (1-5)th tag 40e are attached to a first rack 10a, and a (2-1)th tag 41a, a (2-2)th tag 41b, a (2-3)th tag 41c, a (2-4)th tag 41d, and a (2-5)th tag 41e are attached to a second rack 10b located opposite to the first rack 10a, in order to determine the absolute position of the unmanned aerial vehicle.

In order to recognize tags attached to the racks 10a and 10b and acquire absolute position information of the unmanned aerial vehicle, the tags are attached to the racks 10a and 10b at designated positions, respectively. Thus, when only one tag recognition sensor is provided at the unmanned aerial vehicle, the multiple tags 40a, 40b, 40c, 40d, and 40e are attached to the first rack 10a at designated positions, respectively, and the multiple tags 41a, 41b, 41c, 41d, and 41e are attached to the second rack 10b at designated positions, respectively.

On the other hand, according to another embodiment, when the unmanned aerial vehicle includes: a first tag recognition sensor configured to recognize a tag in front of the unmanned aerial vehicle; and a second tag recognition sensor configured to recognize a tag behind the unmanned aerial vehicle, the number of tags attached to the first rack 10a and the second rack 10b may be reduced by half, compared with the case in which the unmanned aerial vehicle includes only one tag recognition sensor.

Referring to FIG. 14B, when the unmanned aerial vehicle includes the first tag recognition sensor and the second tag recognition sensor, the unmanned aerial vehicle may acquire absolute position information of the unmanned aerial vehicle by recognizing one of the (1-1)th tag 40a attached to the first rack 10a or the (2-1)th tag 41a attached to the second rack 10b at a position opposite to the (1-1)th tag 40a.

That is, the unmanned aerial vehicle may determine information on the current absolute position of the unmanned aerial vehicle by using only one of the (1-1)th tag 40a attached to the first rack 10a or the (2-1)th tag 41a attached to the second rack 10b, and thus one of the (1-1)th tag 40a attached to the first rack 10a or the (2-1)th tag 41a attached to the second rack 10b may be removed. For the same reason as described above, one of the (1-2)th tag 40b and the (2-2)th tag 41b may be removed, and one of (1-3)th tag 40c and the (2-3) tag 41c, one of the (1-4)th tag 40d and (2-4)th tag 41d, and/or one of (1-5)th tag 40e and the (2-5)th tag 41e may be removed.

That is, the unmanned aerial vehicle according to one embodiment may include the first tag recognition sensor and the second tag recognition, and thus may reduce, by half, the number of tags necessary for recognizing the absolute position of the unmanned aerial vehicle. Therefore, it is possible to reduce costs necessary for system establishment.

An unmanned aerial vehicle (UAV) (e.g. the unmanned aerial vehicle 100 in FIG. 2) according to one embodiment may include: a sensor part (e.g. the sensor part 220 in FIG. 3) configured to acquire inertia information or position information of the unmanned aerial vehicle; and a controller (e.g. the controller 240 in FIG. 3) configured to estimate the position of the unmanned aerial vehicle by applying the information acquired by the sensor part to an extended Kalman filter and control movement of the unmanned aerial vehicle, based on the estimated position of the unmanned aerial vehicle, wherein the sensor part includes: an inertia sensor (e.g. the inertia sensor 221 in FIG. 3) configured to acquire the inertia information of the unmanned aerial vehicle; a tag recognition sensor (e.g. the tag recognition sensor 222 in FIG. 3) configured to recognize a tag attached to a fixed place (e.g. the rack 10 in FIG. 1) and acquire absolute position information of the unmanned aerial vehicle; and an image sensor (e.g. the image sensor 223 in FIG. 3) attached to the unmanned aerial vehicle so as to acquire an image of a movement environment of the unmanned aerial vehicle.

According to one embodiment, controller may be configured to calculate first visual movement distance (visual odometry) information of the unmanned aerial vehicle, based on the acquired absolute position information of the unmanned aerial vehicle or the acquired image of the movement environment of the unmanned aerial vehicle.

According to one embodiment, the controller may be configured to calculate the first visual movement distance information of the unmanned aerial vehicle by using scan matching (e.g. hector SLAM).

According to one embodiment, the sensor part may further include an altitude sensor (e.g. the altitude sensor 224 in FIG. 3) configured to acquire altitude information of the unmanned aerial vehicle.

According to one embodiment, the sensor part may further include an upper camera sensor (e.g. the upper camera sensor 225 in FIG. 3) attached to the unmanned aerial vehicle so as to acquire image information of an area above the unmanned aerial vehicle.

According to one embodiment, the controller may be configured to calculate second visual movement distance (visual odometry) information of the unmanned aerial vehicle, based on the acquired image information of the area above the unmanned aerial vehicle According to one embodiment, the sensor part may further include a lower camera sensor (e.g. the lower camera sensor 226 in FIG. 3) attached to the unmanned aerial vehicle so as to acquire image information of an area below the unmanned aerial vehicle.

According to one embodiment, controller may be configured to: extract edge information of an area below a movement path of the unmanned aerial vehicle, based on the acquired image information of the area below the unmanned aerial vehicle; and calculate a lateral position or a yaw angle of the unmanned aerial vehicle, based on the extracted edge information.

According to one embodiment, the controller may be configured to: calculate pseudo-covariance from the image information of the area above the unmanned aerial vehicle by using a visual SLAM algorithm; and apply the calculated pseudo-covariance to an extended Kalman filter.

According to one embodiment, the visual SLAM algorithm may be an ORB-SLAM algorithm.

According to one embodiment, the controller may be configured to: calculate a Mahalanobis distance for information acquired by the sensor part; and classify the acquired information as an outlier when the calculated Mahalanobis distance is equal to or greater than a designated value.

According to one embodiment, the unmanned aerial vehicle may include a barcode reader (e.g. the barcode reader 230 in FIG. 3) configured to recognize a barcode attached to an object.

According to one embodiment, the tag recognition sensor may include: a first tag recognition sensor configured to recognize a tag in front of the unmanned aerial vehicle; and a second tag recognition sensor configured to recognize a tag behind the unmanned aerial vehicle.

According to one embodiment, the image sensor may include at least one of a 2D lidar, a 3D lidar, an RGB-D sensor, and a camera.

A method according to various embodiments may include: acquiring inertia information of an unmanned aerial vehicle; recognizing a tag attached to a fixed place through a tag recognition sensor and acquiring absolute position information of the unmanned aerial vehicle; acquiring first visual movement distance (visual odometry) information of the unmanned aerial vehicle, based on the acquired absolute position information of the unmanned aerial vehicle or an unmanned aerial vehicle movement environment image acquired by an image sensor; and estimating a position of the unmanned aerial vehicle by applying the acquired absolute position information or first visual movement distance information of the unmanned aerial vehicle to an extended Kalman filter.

According to one embodiment, the method may further include acquiring altitude information of the unmanned aerial vehicle through an altitude sensor.

According to one embodiment, the method may further include: acquiring image information of an area above the unmanned aerial vehicle through an upper camera sensor; and calculating second visual movement distance (visual odometry) information of the unmanned aerial vehicle, based on the acquired image information of the area above the unmanned aerial vehicle.

According to one embodiment, the method may further include: acquiring image information of an area below the unmanned aerial vehicle through a lower camera sensor; extracting edge information of an area below a movement path of the unmanned aerial vehicle, based on the acquired image information of the area below the unmanned aerial vehicle; and calculating a lateral position or a yaw angle of the unmanned aerial vehicle, based on the extracted edge information.

According to one embodiment, the method may further include: calculating pseudo-covariance from the image information of the area above the unmanned aerial vehicle by using a visual SLAM algorithm; and applying the calculated pseudo-covariance to an extended Kalman filter.

According to one embodiment, the method may further include: calculating a Mahalanobis distance for the calculated first visual movement distance, second visual movement distance, lateral position, or yaw angle information of the unmanned aerial vehicle or the acquired absolute position information; and classifying the information, for which the Mahalanobis distance is equal to or greater than a designated value, as an outlier.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. An unmanned aerial vehicle comprising:
a sensor part configured to acquire inertia information or position information of the unmanned aerial vehicle; and
a controller configured to estimate a position of the unmanned aerial vehicle and control movement of the unmanned aerial vehicle based on the estimated position of the unmanned aerial vehicle,
wherein the sensor part comprises:
an inertia sensor configured to acquire inertia information of the unmanned aerial vehicle,
a tag recognition sensor configured to recognize a tag attached to a fixed place, and acquire tag recognition information,
an image sensor attached to the unmanned aerial vehicle and configured to acquire an image of a movement environment of the unmanned aerial vehicle, and
a lower camera sensor attached to the unmanned aerial vehicle and configured to acquire image information of an area below a movement path of the unmanned aerial vehicle,
wherein the controller is further configured to:
acquire relative distance information and relative angle information for the recognized tag, compare the relative distance information and the relative angle information with absolute position information of the tag recorded in a predetermined tag map, and acquire absolute position information of the unmanned aerial vehicle based on the recognized tag,
calculate first visual movement distance information of the unmanned aerial vehicle based on the acquired absolute position information of the unmanned aerial vehicle or the acquired image of the movement environment of the unmanned aerial vehicle,
extract first edge information and second edge information based on the image information of the area below the movement path of the unmanned aerial vehicle acquired through the lower camera sensor,
compare the first edge information and the second edge information with a center line of the image information acquired through the lower camera sensor,
acquire lateral position information and yaw angle information based on the comparison,
perform a state prediction of the unmanned aerial vehicle by applying the inertia information to an extended Kalman filter, and
perform a measurement update of the unmanned aerial vehicle by applying the absolute position information, the first visual movement distance information, the acquired lateral position information, and the yaw angle information to the extended Kalman filter.

2. The unmanned aerial vehicle of claim 1, wherein the controller is further configured to calculate the first visual movement distance information of the unmanned aerial vehicle by using a scan matching algorithm.

3. The unmanned aerial vehicle of claim 1,
wherein the sensor part further comprises an altitude sensor configured to acquire altitude information of the unmanned aerial vehicle, and
wherein the controller is further configured to estimate a position of the unmanned aerial vehicle by applying the altitude information to the extended Kalman filter.

4. The unmanned aerial vehicle of claim 1, wherein the sensor part further comprises an upper camera sensor attached to the unmanned aerial vehicle and configured to acquire image information of an area above the unmanned aerial vehicle.

5. The unmanned aerial vehicle of claim 4, wherein the controller is further configured to:
calculate second visual movement distance (visual odometry) information of the unmanned aerial vehicle based on the acquired image information of the area above the unmanned aerial vehicle, and
estimate a position of the unmanned aerial vehicle by applying the second visual movement distance information to the extended Kalman filter.

6. The unmanned aerial vehicle of claim 5, wherein the controller is further configured to:
calculate pseudo-covariance from the image information of the area above the unmanned aerial vehicle by using a visual simultaneous localization and mapping (SLAM) algorithm; and
apply the calculated pseudo-covariance to the extended Kalman filter.

7. The unmanned aerial vehicle of claim 6, wherein the visual SLAM algorithm is an oriented fast and rotated brief-SLAM (ORB-SLAM) algorithm.

8. The unmanned aerial vehicle of claim 1, further comprising a barcode reader configured to recognize a barcode attached to an object.

9. The unmanned aerial vehicle of claim 1, wherein the tag recognition sensor comprises:
a first tag recognition sensor configured to recognize a tag in front of the unmanned aerial vehicle; and
a second tag recognition sensor configured to recognize a tag behind the unmanned aerial vehicle.

10. The unmanned aerial vehicle of claim 1, wherein the image sensor comprises at least one of a two-dimension (2D) lidar, a 3D lidar, a red, green, and blue-D (RGB D) sensor, and a camera.

11. The unmanned aerial vehicle of claim 1, wherein the controller is further configured to:
calculate a Mahalanobis distance for at least one of the absolute position information, the first visual movement information, a second visual movement distance, the lateral position information, or the yaw angle information; and
determine whether to use information for the measurement update of the extended Kalman filter based on whether the calculated Mahalanobis distance is less than a designated value.

12. A method comprising:
acquiring inertia information of an unmanned aerial vehicle;
recognizing a tag attached to a fixed place through a tag recognition sensor;
acquiring relative distance information and relative angle information for the recognized tag;
comparing the relative distance and angle information with absolute position information of the tag recorded in a predetermined tag map;
acquiring absolute position information of the unmanned aerial vehicle based on the comparison;
acquiring an image of a movement environment of the unmanned aerial vehicle through an image sensor attached to the unmanned aerial vehicle;
acquiring first visual movement distance (visual odometry) information of the unmanned aerial vehicle, based on the acquired absolute position information of the unmanned aerial vehicle or the image of an unmanned aerial vehicle movement environment;
acquiring image information of an area below a movement path of the unmanned aerial vehicle through a lower camera sensor attached to the unmanned aerial vehicle;
extracting first edge information and second edge information based on the acquired image information of the area below the movement path of the unmanned aerial vehicle acquired through the lower camera sensor;
comparing the first edge information and the second edge information with a center line of the image information acquired through the lower camera sensor;
acquiring lateral position information and yaw angle information based on the comparison;
performing a state prediction to estimate a position of the unmanned aerial vehicle by applying the inertia information to an extended Kalman filter; and
perform measurement update to estimate the position of the unmanned aerial vehicle by applying the acquired absolute position information the first visual movement distance information, the acquired lateral position information, and the yaw angle information to the extended Kalman filter.

13. The method of claim 12, further comprising;
acquiring altitude information of the unmanned aerial vehicle through an altitude sensor; and
estimating a position of the unmanned aerial vehicle by applying the altitude information to the extended Kalman filter.

14. The method of claim 12, further comprising:
acquiring image information of an area above the unmanned aerial vehicle through an upper camera sensor;
calculating second visual movement distance (visual odometry) information of the unmanned aerial vehicle based on the acquired image information of the area above the unmanned aerial vehicle; and
estimating a position of the unmanned aerial vehicle by applying the second visual movement distance information to the extended Kalman filter.

15. The method of claim 14, further comprising:
calculating pseudo-covariance from the image information of the area above the unmanned aerial vehicle by using a visual SLAM algorithm; and
applying the calculated pseudo-covariance to the extended Kalman filter.

16. The method of claim 14, further comprising:
calculating a Mahalanobis distance for at least one of the absolute position information, the first visual movement distance, the second visual movement distance, the lateral position information, or the yaw angle information of the unmanned aerial vehicle; and
determining whether to use information to the measurement update of the extended Kalman filter based on whether the calculated Mahalanobis distance is less than a designated value.

* * * * *